United States Patent
Nakamura

(10) Patent No.: US 10,241,728 B2
(45) Date of Patent: Mar. 26, 2019

(54) PRINTING APPARATUS AND METHOD FOR CONTROLLING PRINTING APPARATUS

(71) Applicant: SEIKO EPSON CORPORATION, Tokyo (JP)

(72) Inventor: Hideo Nakamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/894,300

(22) Filed: Feb. 12, 2018

(65) Prior Publication Data

US 2018/0239564 A1 Aug. 23, 2018

(30) Foreign Application Priority Data

Feb. 17, 2017 (JP) .................................. 2017-027528

(51) Int. Cl.
*G06F 3/12* (2006.01)

(52) U.S. Cl.
CPC .......... *G06F 3/1204* (2013.01); *G06F 3/1236* (2013.01); *G06F 3/1254* (2013.01); *G06F 3/1257* (2013.01); *G06F 3/1284* (2013.01)

(58) Field of Classification Search
CPC ....... B41J 11/66; G06F 3/0659; G06F 3/1206; G06F 3/1244; G06F 3/1285; G06K 15/022; G06K 15/1802; G06K 15/1807; G06K 15/181; G06K 15/1817; H04N 1/00127
USPC .................................................. 358/1.15, 1.9
See application file for complete search history.

(56) References Cited

U.S. PATENT DOCUMENTS

| | | | | |
|---|---|---|---|---|
| 4,180,854 A * | 12/1979 | Walden | ................... | G06F 15/02 708/130 |
| 6,493,761 B1 * | 12/2002 | Baker | ..................... | H04L 29/06 370/401 |
| 9,575,701 B2 * | 2/2017 | Kamoi | ................. | H04N 1/0023 |
| 9,723,550 B2 * | 8/2017 | Sato | .................. | H04W 36/0066 |
| 9,817,623 B2 * | 11/2017 | Norota | ................... | G06F 3/1253 |
| 10,122,890 B2 * | 11/2018 | Mok | ..................... | H04N 1/0083 |
| 2008/0131182 A1 * | 6/2008 | Okajima | ................ | G06K 15/02 400/76 |
| 2008/0204803 A1 | 8/2008 | Ishida | | |
| 2008/0266596 A1 * | 10/2008 | Sato | ...................... | G06F 3/1204 358/1.15 |
| 2009/0252507 A1 * | 10/2009 | Hiramoto | ............... | H04N 1/387 399/38 |
| 2009/0273804 A1 * | 11/2009 | Kobashi | ................ | G06F 3/1205 358/1.15 |

(Continued)

FOREIGN PATENT DOCUMENTS

| | | |
|---|---|---|
| JP | 06-155808 A | 6/1994 |
| JP | 2000-94766 A | 4/2000 |

(Continued)

*Primary Examiner* — Negussie Worku

(57) ABSTRACT

A printer includes a transmitter and receiver configured to receive a setting command capable of setting a style of a character string for each delimiter area indicating an area of a line delimited by a tab position, a tab command for executing movement to the tab position, and a delimiter string that is delimited by the tab command, a printing apparatus memory configured to store style data, a printing apparatus processor configured to execute processing on the delimiter string based on the style of the corresponding delimiter area, and a printing mechanism configured to print the character string which is processed by the printing apparatus processor.

14 Claims, 13 Drawing Sheets

(56) References Cited

U.S. PATENT DOCUMENTS

| | | | |
|---|---|---|---|
| 2011/0128583 A1 | 6/2011 | Ishida | |
| 2013/0329253 A1* | 12/2013 | Sasaki | H04N 1/0035 358/1.15 |
| 2016/0073348 A1* | 3/2016 | Tsuzuki | H04W 52/0229 358/1.13 |
| 2016/0360052 A1* | 12/2016 | Yoneda | G03G 15/5066 |
| 2018/0004464 A1* | 1/2018 | Sone | G06F 3/1238 |
| 2018/0121770 A1 | 5/2018 | Nakamura | |
| 2018/0349081 A1* | 12/2018 | Kanamaru | G06F 3/1292 |

FOREIGN PATENT DOCUMENTS

| | | |
|---|---|---|
| JP | 2001-075753 | 3/2001 |
| JP | 2018-069512 A | 5/2018 |

* cited by examiner

FIG. 4

$\underline{TC1}$

<ESC> 'D' 5 31
         ↑ ↑
        ST1 ST2

FIG. 5

$\underline{STC1}$

<ESC> 'X' " R1I ; LOS ; R2$ "
           ↑     ↑     ↑
          SS1   SS2   SS3

<ESC> 'D' 21
                        ↑
                       ST3

FIG. 10

STC2
                     ↓

<ESC> 'X' " LN(2Y)(1T)S ; RE(1Y)(1T)¥ "
                      ↑              ↑
                     SS4            SS5

<ESC> 'D' 21 51
            ↑   ↑
           ST4 ST5

PRINTING APPARATUS AND METHOD FOR CONTROLLING PRINTING APPARATUS

This application claims priority under 35 U.S.C. § 119 to Japanese Patent Application No. 2017-027528 filed on Feb. 17, 2017, the entire disclosure of which is expressly incorporated by reference herein.

BACKGROUND

1. Technical Field

The present invention relates to a printing apparatus and a method for controlling the printing apparatus.

2. Related Art

In the related art, a printing apparatus that executes printing based on data received from an external device is known (for example, see JP-A-6-155808). In JP-A-6-155808, a printer that receives a print range designation command from a higher-level device, compares a printing position of data received from the higher-level device with a print range designated by the print range designation command, and prints only the data within the print range is disclosed.

In general, a printing apparatus as described in JP-A-6-155808 is desired to execute printing in a format desired by a user (application) in printing of a receipt or the like, for example. However, in order to obtain the format desired by the user, setting the position of a character to be printed is not sufficient. When executing the printing in the format, various types of settings are required. However, there is a problem in that since performing the various types of setting is complicated, it takes time and labor for the user.

SUMMARY

An advantage of some aspects of the invention is that it is possible to print in the format desired by the user without taking time and labor of the user.

According to an aspect of the invention, a printing apparatus includes a communicator configured to receive a setting command capable of setting a style of a character string for each delimiter area indicating an area of a line delimited by a tab position, a tab command for executing movement of a printing position to the tab position, and a delimiter string that is delimited by the tab command, a memory configured to store information indicating the style, a processor configured to execute processing on the delimiter string based on the style of the corresponding delimiter area, and a printing mechanism configured to print the delimiter string which is processed by the processor.

In this case, when receiving the one-line character string including the tab command, since the printing apparatus executes processing on the delimiter string corresponding to the delimiter area based on the preset style for each delimiter area by the tab command and prints the delimiter string in which the processing is executed, it can be simply printed in a format desired by a user without taking time and labor of the user.

In addition, in the apparatus, based on the set tab position, the processor may execute processing on the assumption that the delimiter area from a beginning of the line to a first tab position is the first delimiter area, and the delimiter area from the last tab position to a termination of the line is the last delimiter area based on the style.

In this case, the delimiter string to be printed in one line can be printed in one line, and it can be simply printed in a format desired by the user.

In addition, in the apparatus, in a case where the tab position is not set, the processor may execute processing on the assumption that the area from the beginning to the termination of the line is the delimiter area based on the style.

In this case, even in a case where the tab position is not set, it can be simply printed in a format desired by the user.

In addition, in the apparatus, the information indicating the style may be at least information for setting any one of alignment, margin, character decoration, and a character size.

In this case, any one of the alignment, the margin, the character decoration, and the character size can be set to the delimiter string corresponding to the delimiter area for each delimiter area, and it can be simply printed in a format desired by the user.

In the apparatus, the information indicating the style may be at least information for setting any one of character string trimming and numerical formatting.

In this case, at least any one of the character string trimming and the numerical formatting can be set to the delimiter string corresponding to the delimiter area for each delimiter area, and it can be simply printed in a format desired by the user.

In addition, in the apparatus, in a case where the tab position is set at a position where the number of digits exceeds the number of printable digits of one line, the processor may execute processing on the one-line character string such that a printing result by the printing mechanism becomes a plurality of lines.

In this case, the one line can be printed in a plurality of lines by setting the preset tab position to the position where a line becomes a plurality of lines and it can be simply printed in a format desired by the user.

In addition, in this apparatus, the printing mechanism may include a cutter configured to cut a printing medium and issues the printing medium cut by the cutter as a receipt.

In this case, the receipt can be simply issued in a format desired by the user without taking time and labor of the user.

According to another aspect of the invention, a method for controlling a printing apparatus including a memory configured to store information indicating a style of a character string, the method includes receiving a setting command capable of setting a style of a character string for each delimiter area indicating an area of a line delimited by a tab position, a tab command for executing movement of a printing position to the tab position, and a delimiter string that is delimited by the tab command, executing processing on the delimiter string based on the style of the corresponding delimiter area, and printing the processed delimiter string.

In this case, when receiving the one-line character string including the tab command, since the printing apparatus executes processing on the delimiter string corresponding to the delimiter area based on the preset style for each delimiter area by the tab command and prints the delimiter string in which the processing is executed, it can be simply printed in a format desired by a user without taking time and labor of the user.

BRIEF DESCRIPTION OF THE DRAWINGS

The invention will be described with reference to the accompanying drawings, wherein like numbers reference like elements.

FIG. 4 is a diagram illustrating an example of a tab position setting command.

FIG. 5 is a diagram illustrating an example of a setting command.

FIG. 9 is a diagram illustrating an example of the tab position setting command.

FIG. 10 is a diagram illustrating an example of the setting command.

FIG. 13 is a diagram illustrating an example of the tab position setting command.

DESCRIPTION OF EXEMPLARY EMBODIMENTS

Figure 1:
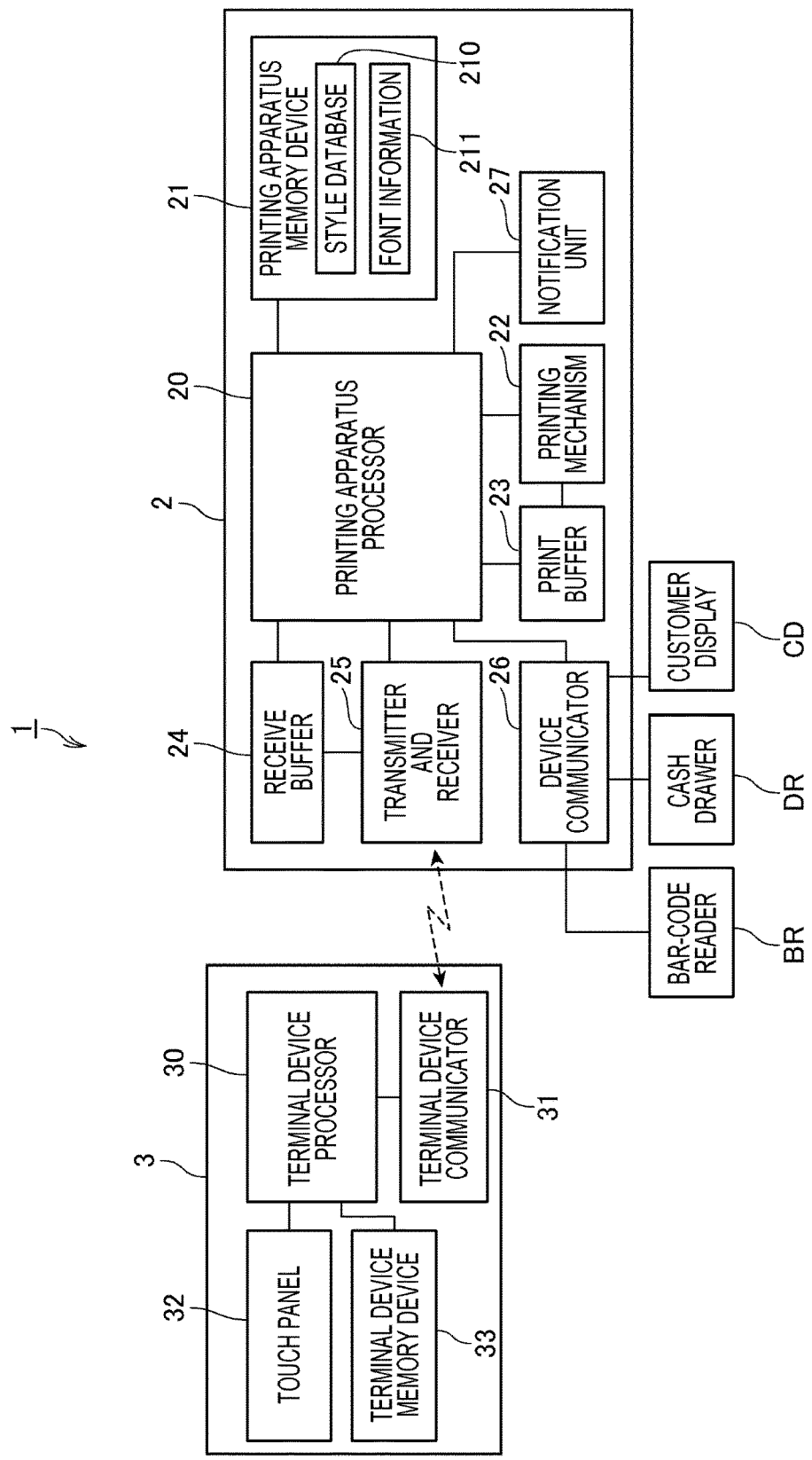
FIG. 1 is a diagram illustrating a configuration of a printing system.

FIG. 1 is a diagram illustrating a configuration of a printing system.

The printing system 1 is, for example, a system to be used for shops such as supermarkets, convenience stores, department stores, restaurants, and the like. For example, the printing system 1 has a function of performing an accounting according to a product purchased by a customer, a function of issuing a receipt according to the accounting, and the like.

As illustrated in FIG. 1, the printing system 1 includes a printer 2 (printing apparatus) and a tablet terminal device 3.

The printer 2 is a terminal printer that accommodates a roll paper (printing medium), forms dots with a line type thermal head on the accommodated roll paper, and prints characters, images, and the like.

A printing method of the printer 2 according to the present embodiment is a thermal method. However, the printing method of the printer 2 is not limited to the thermal method, and may be other printing methods such as an ink jet method. The printing head of the printer 2 is not limited to the line type printing head, and may be a serial type printing head.

As illustrated in FIG. 1, the printer 2 includes a printing apparatus processor 20 (processor), a printing apparatus memory device 21 (memory), a printing mechanism 22, a print buffer 23 (ramdam access memory), a receive buffer 24 (ramdam access memory), a transmitter and receiver 25 (communicator, communication circuit, communication board), a device communicator 26 (communication circuit, communication board), and a notification unit 27.

The printing apparatus processor 20 includes a CPU (processor), a ROM (memory), a RAM (memory), other control circuits, and the like, and controls each unit of the printer 2.

The printing apparatus memory device 21 includes a hard disk, a nonvolatile memory element such as an EEPROM, and stores data rewritably. In addition to a control program that the CPU of the printing apparatus processor 20 reads and executes processing of each unit in the printer 2, the printing apparatus memory device 21 also stores a style database 210 and font information 211. The style database 210 and the font information 211 will be described.

The printing mechanism 22 includes a transport mechanism for transporting the roll paper accommodated in a housing of the printer 2, a printing mechanism for forming dots on the roll paper by the thermal head to print characters, images, and the like, and a cutter for cutting the roll paper at a predetermined position. Under the control of the printing apparatus processor 20, the printing mechanism 22 transports the roll paper by the conveyance mechanism, prints characters, images, and the like related to the receipt on the roll paper by the printing mechanism, cuts the roll paper at a predetermined position by the cutter, and then issues the paper as a receipt.

The print buffer 23 is a temporary storage area called RAM, and is configured of, for example, a semiconductor storage device. Under the control of the printing apparatus processor 20, the print buffer 23 stores image data such as characters and images to be printed on the roll paper. The print buffer 23 may be formed in a predetermined storage area of the RAM of the printing apparatus processor 20.

The receive buffer 24 is a temporary storage area called RAM, and is configured of, for example, a semiconductor storage device. The receive buffer 24 stores data received from the outside under the control of the printing apparatus processor 20. In the present embodiment, the receive buffer 24 stores data received from the tablet terminal device 3 by the transmitter and receiver 25.

The transmitter and receiver 25 communicates with the tablet terminal device 3 according to a predetermined wireless communication standard under the control of the printing apparatus processor 20. The wireless communication standard of the communication performed between the printer 2 and the tablet terminal device 3 may include any standard such as a wireless LAN standard corresponding to an ad hoc mode, a wireless LAN corresponding to an infrastructure mode, or a standard related to a near field communication such as Bluetooth (registered trademark). The transmitter and receiver 25 may have a wired communication function and perform wired communication with the tablet terminal device 3.

The device communicator 26 (transmitter and receiver) is a port according to a USB standard, a port according to a serial communication standard other than the USB (RS 232 C or the like), a port according to a parallel communication standard (IEEE 1284 or the like), a port according to a communication standard (Ethernet (registered trademark) or the like) relating to the wired LAN or the like, and an interface board having other ports. A device can be connected to each port. The device communicator 26 communicates with a device connected to the printer 2 through a port under the control of the printing apparatus processor 20. The device communicator 26 may have a wireless communication function and wirelessly communicate with the device.

As a device, a barcode reader BR, a customer display CD, and a drawer (cash drawer) DR are connected to the printer 2.

The barcode reader BR reads the barcode attached to the product, the package of products, or the like, and outputs data indicating a reading result to the device communicator 26. The device communicator 26 outputs the data input from the barcode reader BR to the printing apparatus processor 20.

The customer display CD displays information on accounting under the control of the printing apparatus processor 20. The information displayed on the customer display CD can be recognized by the customer who performs accounting.

The drawer DR is a device including a tray for storing cash and the like and a mechanism capable of withdrawing a tray with respect to a main body of the drawer DR.

The notification unit 27 includes an LED, a liquid crystal display panel, and the like, and notifies various kinds of information under the control of the printing apparatus processor 20. For example, the notification unit 27 lights up and turns off one or more LEDs in a predetermined manner, whereby notifying various information. The notification unit 27 may output sound information indicating sound.

Next, the tablet terminal device 3 will be described.

The tablet terminal device 3 is a tablet type (plate-like) terminal device in which a touch panel 32 is provided in a wide front area. For example, the tablet terminal device 3 functions as a host computer that controls the printer 2 by executing various processes related to accounting in accounting.

Figure 2:
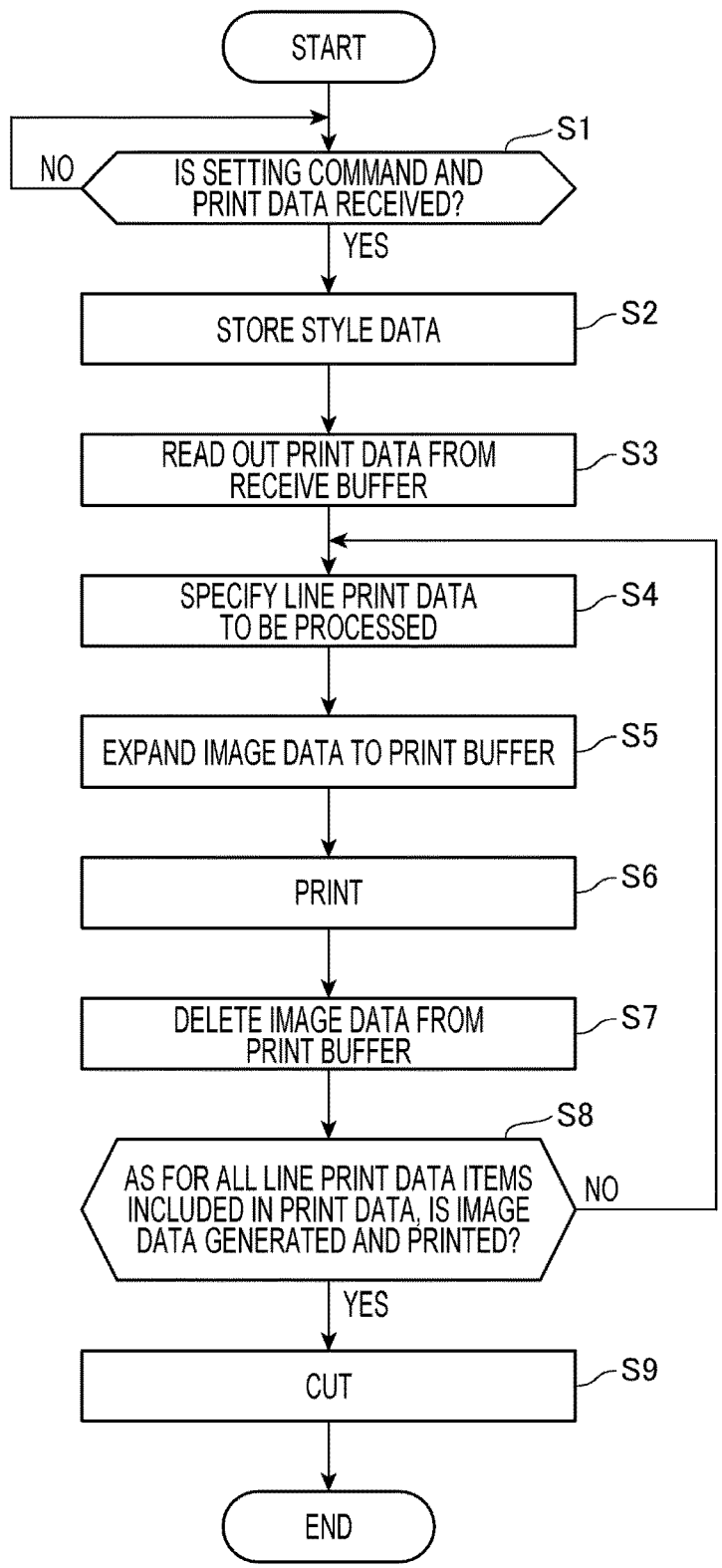
FIG. 2 is a flowchart illustrating an operation of a printer.

As illustrated in FIG. 2, the tablet terminal device 3 includes a terminal device processor 30, a transmitter and receiver 31, the touch panel 32, and a terminal device memory device 33.

The terminal device processor 30 includes the CPU (processor), the ROM, the RAM, other control circuits, and the like, and controls each unit of the tablet terminal device 3. The terminal device processor 30 reads out and executes an application program stored in the terminal device memory device 33.

Under the control of the terminal device processor 30, the transmitter and receiver 31 communicates with the printer 2 according to a predetermined wireless communication standard.

The touch panel 32 includes a display panel such as a liquid crystal display panel and a touch sensor overlaid on the display panel. The display panel displays various images under the control of the terminal device processor 30. The touch sensor detects a touch operation and outputs it to the terminal device processor 30. The terminal device processor 30 executes a process corresponding to a touch operation based on an input from the touch sensor.

The terminal device memory device 33 includes the hard disk, the nonvolatile memory element such as the EEPROM, and stores the data rewritably.

Here, operations of the printer 2 and the tablet terminal device 3 will be described as an example of configuring the printing system 1. In the description here, it is assumed that the tablet terminal device 3 has the printer driver installed in advance.

The terminal device processor 30 of the tablet terminal device 3 reads and executes the application (browser or the like) that is preinstalled in the tablet terminal device 3. Therefore, it is converted into characters, images, or the like to be printed on the roll paper accommodated by the printer 2 and generates print data including such information. Here, the print data includes at least a character string to be printed on the roll paper. Each character included in the character string is expressed as a predetermined character code (ASCII code and Unicode).

Subsequently, the terminal device processor 30 reads and executes the printer driver installed in advance in the tablet terminal device 3. Therefore, based on the print data generated by the function of the application, the terminal device processor 30 generates a control command corresponding to the command system stored in the printing apparatus memory device 21 of the printer 2. Here, the control command includes at least a command instructing execution of printing in a predetermined form of character string information included in the print data. The command includes a command for inserting a character string included in the print data and generating image data such that a predetermined character string is printed in a predetermined manner at a predetermined position, or a command for driving a thermal head or a conveyance mechanism, and performing printing. The terminal device processor 30 transmits the print data and the control command to the printer 2.

The printing apparatus processor 20 of the printer 2 receives the print data and the control command by the transmitter and receiver 25 and executes the processing instructed by the control command to execute printing based on the print data on the roll paper.

Here, for example, in the case of the following aspects, the printer 2 may not execute the printing desired by the user.

One of such modes is a case where the tablet terminal device 3 does not install the printer driver.

As described above, in the operations of the printer 2 and the tablet terminal device 3 configuring the printing system 1, it is assumed that the printer driver is installed in advance in the tablet terminal device 3. However, the printer driver may not be installed in some cases depending on the tablet terminal device 3. In this case, since the printer driver is not installed, the tablet terminal device 3 cannot generate a control command, and transmits the print data to the printer 2 without a control command. In this case, there is a possibility that the printer 2 cannot execute printing in a format desired by the user.

In addition, as another aspect, there is a case where print data generated by an application (such as a browser) is directly transmitted to the printer 2 without involving a printer driver installed in the tablet terminal device 3.

In the former aspect, the user can execute the printing desired by the user by installing the printer driver on the tablet terminal device 3. However, for users who have poor knowledge of installing the printer driver, installation of the printer driver It is not easy and it takes time and labor to install.

Further, in the former aspect and the latter aspect, the user always inserts a control command into the print data by the application of the tablet terminal device 3. Therefore, the printer 2 can execute printing in a format desired by the user. However, it is difficult and time-consuming for the user to always insert a control command into print data on the application side. Even if the user temporarily inserts the control command into the print data on the application side, it is necessary to confirm whether the format is the desired format, when changing the character string included in the control command or the print data later, and it takes more time and labor.

For example, in a character string printed on a receipt, the printing position (print layout) is often determined in advance so that the customer can easily read the character string on the printing surface on which the character string is printed according to predetermined contents (attributes). For example, among character strings printed on the receipt, the character string indicating the amount of money is printed on the right of the printing surface. In addition, the character string indicating a name (for example, a name indicating a product name, total, or the like) as to what is printed on the left side or toward the center with respect to the printing surface. In addition, the character string indicating the number of products is printed on the right side of the product name. Therefore, as described above, even in a case where the tablet terminal device 3 does not install the printer driver or when transmitting the print data without involving the printer driver, by setting the tab position indicating the position at which printing is started, it is possible to arrange the printing position of the character string in the format of the receipt. However, the character string printed on the receipt is subjected to various types of processing such as processing printing is performed when the size of the character is printed with a size of a double width size (in the present embodiment, twice the half size of the line direction (horizontal direction)) or half size, processing in which the trimming of the character string is performed and printing is performed, or processing in which alignment and printing are performed. Therefore, there is a possibility that the format of the receipt does not become the format desired by the user only by setting the printing position of the character string. However, as described above, it is complicated to change print data so that various processes are performed on the application side, and it takes time and labor of the user.

Therefore, the printer 2 of the present embodiment performs the following operations.

FIG. 2 is a flowchart illustrating an operation of the printer 2.

The terminal device processor 30 of the tablet terminal device 3 transmits the setting command and the print data to the printer 2. The setting command will be described in detail by giving an example later. However, the setting command is a command capable of setting the style of the character string (that is, the format) for each delimiter area indicating the area of the line delimited by the tab position set in advance by the tab position setting command (described later). In the present embodiment, it is assumed that one character also corresponds to a character string.

The printing apparatus processor 20 of the printer 2 determines whether the setting command and print data are received from the tablet terminal device 3 by the transmitter and receiver 25 (step SA1). The received setting command and print data are stored in the receive buffer 24.

In a case where it is determined that the setting command is received from the tablet terminal device 3 (step SA1: YES), the printing apparatus processor 20 reads the setting command from the receive buffer 24, and stores the style data (information indicating the style) to the style database 210 of the printing apparatus memory device 21 for each delimiter area designated by the setting command based on the setting command (step S2). The style database 210 is a database that stores the delimiter area and a plurality of style data items corresponding to the delimiter area.

The style data is data specifying the printing style, as will be described later while exemplifying the style data. The style data may be configured of a command for designating a format related to printing which is normally used. In this case, the CPU of the printing apparatus processor 20 reads and executes a command which is style data stored in the style database 210, generates image data, stores the data in the print buffer 23, and prints the data by the printing mechanism 22. As an example of the format relating to printing, in the present embodiment, there are alignment, character decoration, numerical format, margin, a character size, and trimming of a character string. The alignment means that the delimiter string is aligned in a predetermined direction. In addition, the character decoration indicates that decorations such as bold, italic, underlines, or the like are applied to the delimiter string. In the numerical format, the delimiter string is a numerical value, and it is a format for printing the numerical value. The margin indicates that a blank space is added to the beginning (left margin) or the termination (right margin) of the delimiter string. The character size indicates the size of each character of the delimiter string. The trimming of the character string indicates that a predetermined number of characters are deleted from the delimiter string.

In a case where it is determined that the print data is received from the tablet terminal device 3 (step SA1: YES), the printing apparatus processor 20 reads the print data received from the tablet terminal device 3 from the receive buffer 24 (step S3).

Figure 3:
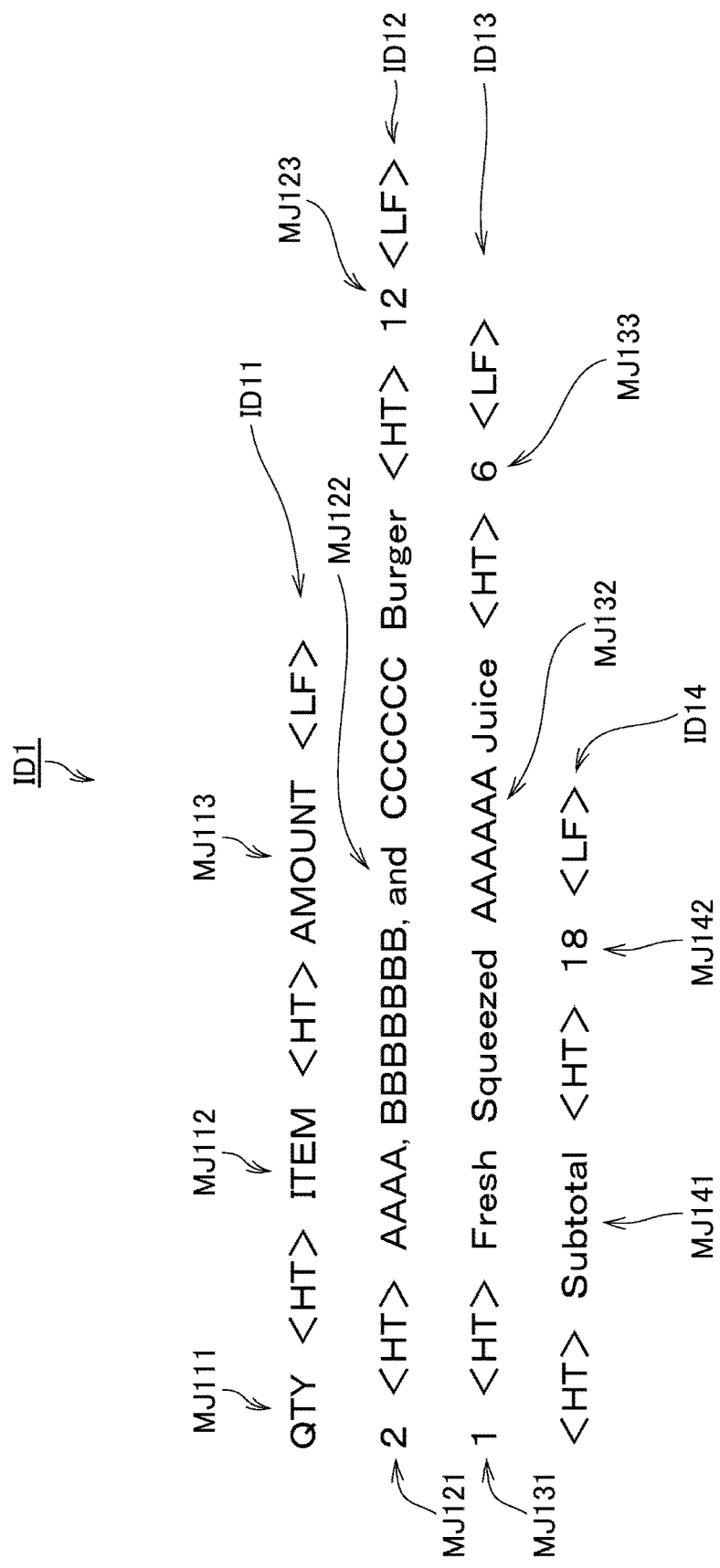
FIG. 3 is a diagram illustrating an example of print data.

In the present embodiment, the print data received by the printer 2 is print data as illustrated in FIG. 3.

FIG. 3 is a diagram illustrating an example of print data.

The print data ID1 illustrated in FIG. 3 includes line print data ID11, line print data ID12, line print data ID13, and line print data ID14. Each of the line print data ID11 to the line print data ID14 is print data for one line when printing the character string on the roll paper.

Each of the line print data ID11 to the line print data ID14 includes a tab command for executing moving the printing position up to the tab position set by the tab position setting command (described later), and a line feed command for executing printing and line feed (paper feeding for one line). In FIG. 3, the tab command is denoted as "<HT>" (horizontal tab). In addition, the line feed command is denoted as "<LF>" (line feed). In addition, instead of the line feed command, "<CR>" (Carriage Return) indicating a command to execute cursor return (print) may be used.

The line print data ID11 includes a character string MJ111 indicating "QTY", a character string MJ112 indicating "ITEM", and a character string MJ113 indicating "AMOUNT". The character string MJ111, the character string MJ112, and the character string MJ113 are delimited by the tab command <HT>. Therefore, each of the character string MJ111, the character string MJ112, and the character string MJ113 corresponds to a delimiter string in which the character string indicated by the line print data ID11 is delimited by the tab command. The character string indicated by the line print data ID11 is a character string including the character string MJ111, the character string MJ112, and the character string MJ113.

The line print data ID12 includes a character string MJ121 indicating "2", a character string MJ122 indicating "AAAA, BBBBBBBB, and CCCCCC Burger", and a character string MJ123 indicating "12". The character string MJ121, the character string MJ122, and the character string MJ123 are delimited by the tab command <HT>. Therefore, each of the character string MJ121, the character string MJ122, and the character string MJ123 corresponds to the delimiter string in which the character string indicated by the line print data ID12 is delimited by the tab command. The character string indicated by the line print data ID12 is a character string including the character string MJ121, the character string MJ122, and the character string MJ123.

The line print data ID13 includes a character string MJ131 indicating "1", the character string MJ132 indicating "Fresh Squeezed AAAAAA Juice", and a character string MJ133 indicating "6". The character string MJ131, the character string MJ132, and the character string MJ133 are delimited by the tab command <HT>. Therefore, each of the character string MJ131, the character string MJ132, and the character string MJ133 corresponds to a delimiter string in which the character string indicated by the line print data ID13 is delimited by a tab command. The character string indicated by the line print data ID13 is a character string including the character string MJ131, the character string MJ132, and the character string MJ133.

The line print data ID14 includes a character string MJ141 indicating "Subtotal" and a character string MJ142 indicating "18". The character string MJ141 and the character string MJ142 are delimited by tab commands. Therefore, each of the character string MJ141 and the character string MJ142 corresponds to a delimiter where the character string indicated by the line print data ID14 is delimited by the tab command <HT>. The character string indicated by the line print data ID14 is a character string including the character string MJ141 and the character string MJ142.

As described above, the printer 2 according to the present embodiment receives print data having one or a plurality of lines of print data, and one line print data having a delimiter string delimited by the tab command <HT>. Each character of the delimiter string is expressed by a predetermined character code. In the present embodiment, receiving the print data from the tablet terminal device 3 corresponds to receiving the character string including the tab command from the tablet terminal device 3.

Returning to the description of the flowchart illustrated in FIG. 2, when the printing apparatus processor 20 reads the received print data from the receive buffer 24, the printing apparatus processor 20 performs processing from step S5 to step S7 from the beginning to the line feed command <LF> as line print data (step S4).

Subsequently, the printing apparatus processor 20 develops (generation and storing) the image data to the print buffer 23 based on the line print data specified in step S4, the style data stored in step S2, and the font information 211 of the printing apparatus memory device 21 (step S5). The font information 211 is actual data expressing characters on the roll paper in a printable aspect, and for example, bitmap font data can be included. In the font information 211, actual data and character codes are associated with each character. Regarding each character in the delimiter string of the line print data, the printing apparatus processor 20 reads the actual data corresponding to the character code included in the received line print data by referring to the font information 211, refers the style database 210 performs processing based on the corresponding style data for each delimiter string delimited by the tab command <HT>, and develops the image data to the print buffer 23. These processes are repeatedly performed for one line until the line feed command <LF>. The printing apparatus processor 20 reads the developed image data from the print buffer 23 by the line feed command <LF>, controls the printing mechanism 22, and executes printing of one line (step S6). Subsequently, when printing of one line is executed, the printing apparatus processor 20 deletes the image data developed in the print buffer 23 (step S7). At this time, the print data or the like, in which the processing of the receive buffer 24 is ended, is deleted in preparation for the next reception.

Subsequently, the printing apparatus processor 20 generates image data for all of one or a plurality of line print data items included in the received print data, and determines whether the printing is executed (step S8).

In a case where it is determined that the printing is not ended by generating the image data for all of one or a plurality of line print data items included in the received print data (step S8: NO), the printing apparatus processor 20 causes the process to proceed to step S3. On the other hand, in a case where it is determined that printing is ended by generating image data for all of one or a plurality of line print data items included in the received print data (step S8: YES), the printing apparatus processor 20 cuts the roll paper at an appropriate position by operating the cutter of the printing mechanism 22 (step S9). The cut may be executed by the received cutter command. Accordingly, the printing apparatus processor 20 issues a receipt.

Here, the operation of the printer 2 will be described in more detail by referring a plurality of examples.

Example 1

Figure 6:
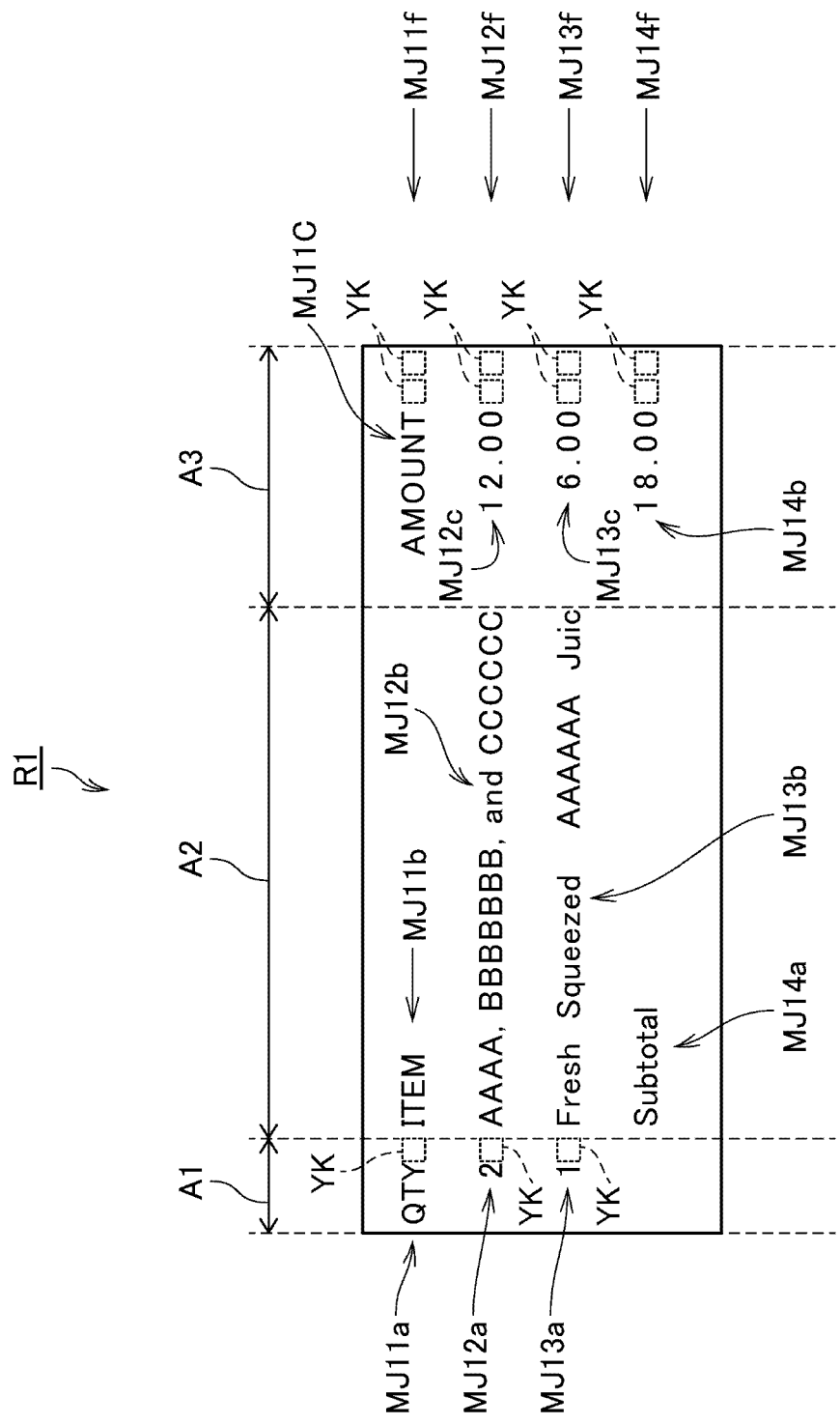
FIG. 6 is a diagram illustrating an example of a printing result.

In Example 1, a case where a receipt R1 illustrated in FIG. 6 is issued based on the print data ID1 illustrated in FIG. 3, a tab position setting command TC1 illustrated in FIG. 4, and a setting command STC1 illustrated in FIG. 5 will be exemplified. In Example 1, the number of digits printable by one line on the printing surface of the roll paper is set to 42 digits.

FIG. 4 is a diagram illustrating an example of a tab position setting command for setting the tab position.

The tab position setting command TC1 illustrated in FIG. 4 includes a setting value indicating the number of digits from the left end (beginning) of the line to the tab position to be set on the area of one line on the printing surface of the roll paper. The number of digits here is the number of digits in a case where the characters are printed in half size. As illustrated in FIG. 2, the tab position setting command TC1 includes <ESC> indicating that it is a command, "'D'" indicating that this command is a tab position setting command, a setting value ST1 indicating "5", and a setting value ST2 indicating "31". That is, the tab position setting command TC1 illustrated in FIG. 2 is a command for instructing setting the tab position to the fifth digit from the left end of the line on the printing surface and to set the tab position to a thirty-first digit from the left end of the line. That is, since the tab position setting command TC1 illustrated in FIG. 4 has 42 digits that can be printed by one line in Example 1, the tab position setting command TC1 corresponds to the command for instructing delimiting the area of the line into three areas of an area from 1 to 4 digits, an area from 5 to 30 digits, and an area from 31 to 42 digits. These delimiter areas correspond to the delimiter areas indicating the areas of the lines delimited by the tab positions.

FIG. 5 is a diagram illustrating an example of a setting command.

The setting command STC1 illustrated in FIG. 5 includes a style setting value indicating a setting value for designating style data to be processed on the delimiter string corresponding to the delimiter area for each of the delimiter areas delimited by the tab position set by the tab position setting command. The setting command STC1 illustrated in FIG. 5 includes the <ESC> indicating that it is the command, the "'X'" indicating that this command is a command designating the style, and a style setting value SS1 indicating "R1I", a style setting value SS2 indicating "L0S", and a style setting value SS3 indicating "R2$" in order of the corresponding delimiter string.

The style setting value SS1 indicating "R1I" is configured of a plurality of style setting values. That is, the style setting value SS1 indicating "R1I" is configured of a style setting value indicating "R", a style setting value indicating "1", and a style setting value indicating "I". The style setting value indicating "R" is a setting value for designating style data (hereinafter, referred to as "right align style data") of the delimiter string to be set in the right alignment in the delimiter area. In addition, the style setting value indicating "1" indicates a setting value designating the style data (hereinafter, referred to as "1 margin style data") for setting a margin (that is, a blank space) for one digit at the termination of the delimiter string in the delimiter area. In addition, in a case where the delimiter string is a numeric character, the style setting value indicating "I" is a setting value designating style data (hereinafter, referred to as "integer format style data") for setting the numerical character to an integer format in the delimiter area.

The style setting value SS2 indicating "LOS" is configured of a plurality of style setting values. That is, the style setting value SS2 indicating "LOS" is configured of a style setting value indicating "L", a style setting value indicating "0 (zero)", and a style setting value indicating "S". The style setting value indicating "L" is a setting value for designating style data (hereinafter, referred to as "left align style data") of the delimiter string to be set in the left alignment in the delimiter area. In addition, the style setting value indicating "0" is a setting value designating the style data (hereinafter, referred to as "marginless style data") for setting that the margin is not provided at the beginning and the termination of the delimiter string in the delimiter area. In addition, the style setting value indicating "S" is a setting value designating the style data (hereinafter, referred to as "trimming style data") for setting the trimming of the delimiter string such that the number of digits of the delimiter string is equal to or less than the number of digits of the printable characters in the delimiter area, in delimiter area.

The style setting value SS3 indicating "R2$" is configured of a plurality of style setting values. That is, the style setting value SS3 indicating "R2$" is configured of the style setting value indicating "R", a style setting value indicating "2", and a style setting value indicating "$". The style setting value indicating "R" is the same as the style setting value described above. In addition, the style setting value indicating "2" indicates a setting value designating the style data (hereinafter, referred to as "2 margin style data") for setting a margin (that is, a blank space) for two digits at the termination of the delimiter string in the delimiter area. In addition, in a case where the delimiter string is a numeric character, the style setting value indicating "$" is a setting value for designating style data (hereinafter, referred to as "US currency style data") for setting the number in the format of the US currency in the delimiter area.

As indicated by the setting command STC1 illustrated in FIG. 5, the style setting value SS1, style setting value SS2, and style setting value SS3 are delimited by ";". ";" corresponds to the tab position set by the tab position setting command TC2. It indicates that the style setting value SS1 designates the style data of the delimiter string corresponding to the first delimiter area among the delimiter areas delimited by the tab position setting command TC2. In addition, it indicates that the style setting value SS2 designates the style data of the delimiter string corresponding to a middle delimiter area among the delimiter areas delimited by the tab position setting command TC2. In addition, it indicates that the style setting value SS3 designates the style data of the delimiter string corresponding to the last delimiter area among the delimiter areas delimited by the tab position setting command. The first delimiter area, the middle delimiter area, and the last delimiter area will be described later.

The description will be given with reference to FIG. 2. When the setting command STC1 is received from the tablet terminal device 3 (step S1: YES), the printing apparatus processor 20 reads the setting command STC1 from the receive buffer 24 and stores the style data items designated by the setting command STC1 in association with the tab position information items stored in the printing apparatus memory device 21, respectively (step S2). In this case, the tab position setting command TC1 may be received in advance and the tab position information may be set in advance. The tab position information set by the tab position setting command TC1 is stored in the printing apparatus memory device 21. The information on an initial value of the tab position is stored in advance in the printing apparatus memory device 21. As described above, the setting command STC1 includes the style setting value SS1, the style setting value SS2, and the style setting value SS3.

Accordingly, the printing apparatus processor 20 reads and acquires the right align style data, the 1 margin style data, the integer format style data, and the corresponding tab position information from the style database 210 stored in the printing apparatus memory device 21 based on the style setting value SS1. In addition, the printing apparatus processor 20 reads and acquires the left alignment style data, the marginless style data, the trimming style data from, and the corresponding tab position information from the style database 210 stored in the printing apparatus memory device 21 based on the style setting value SS2. In addition, the printing apparatus processor 20 reads and acquires the right align style data, the 2 margin style data, the US currency style data, and corresponding tab positions based on the style setting value SS3.

In a case where it is determined that the print data is received from the tablet terminal device 3 (step SA1: YES), when the printing apparatus processor 20 reads the print data ID1 received from the tablet terminal device 3 from the receive buffer 24 (step S3), each data is specified as line print data to be processed in step S5 to step S7 by the line feed command <LF> among the line print data ID11 to the line print data ID14 included in the print data ID1 (step S4).

In a case where the print data ID1 is read from the receive buffer 24 and the line print data is firstly specified, first, the printing apparatus processor 20 specifies the first line feed command <LF> as the line print data ID11.

Subsequently, the printing apparatus processor 20 generates image data based on the tab position information stored in the printing apparatus memory device 21 based on the tab position setting command TC1, the style data stored in the style database 210 based on the setting command STC1, and the font information 211 corresponding to the line print data ID11 including the tab command specified in step S4 and the character code of the line print data ID11, and develops the image data to the print buffer 23 (step S5).

Here, step S5 will be described in detail.

FIG. 6 is a diagram illustrating an example of a printing result, and particularly, illustrating a printing result based on the print data ID1 illustrated in FIG. 3, the tab position setting command TC1 illustrated in FIG. 4, and the setting command STC1 illustrated in FIG. 5.

The printing apparatus processor 20 specifies the first delimiter area, the middle delimiter area, and the last delimiter area based on the tab position setting command TC1. As described above, the tab position setting command TC1 is a command instructing setting the tab position to the fifth digit from the left end of the line and the thirty-first digit from the left end of the line, and the set tab position information is stored in the printing apparatus memory device 21. The left end of the line is the beginning of the line on the printing surface of the roll paper. The printing apparatus processor 20 specifies an area from the left end, which is the beginning of the line, to the fourth digit, that is, from the left end of the line to the first tab position as the first delimiter area. In a case of FIG. 6, the printing apparatus processor 20 specifies an area A1 as the first delimiter area. In addition, the printing apparatus processor 20 specifies an area from the fifth digit to the thirtieth digit of the line as the middle delimiter area. In the case of FIG. 6, the printing apparatus processor 20 specifies an area A2 as the middle delimiter area. In addition, the printing apparatus processor 20 specifies an area from the thirty-first digit of the line to the right end of the line that is from the last tab position to the termination of the line as the last delimiter area. The right end of the line is the termination of the line on the printing surface of the roll paper. In the case of FIG. 6, the printing apparatus processor 20 specifies an area A3 as the last delimiter area.

Subsequently, the printing apparatus processor 20 specifies the character string (delimiter string) to be printed on the area A1 that is the first delimiter area from the line print data ID11 by the tab command <HT>. As illustrated in FIG. 3, the line print data ID11 is delimited by the tab command <HT> for sequentially moving the printing position based on the tab position information stored in the printing apparatus memory device 21. The printing apparatus processor 20 sequentially moves positions (memory addresses) to be developed in the print buffer 23 by the tab command <HT>, and reflects the positions in the printing result. In addition, the tab position information defines the position serving as a reference of the next printing position in the line. The delimiter area corresponds to the range delimited by the tab position information set and stored by the tab position setting command TC1. Therefore, the printing apparatus processor 20 specifies the character string MJ111 (delimiter string) from the line print data ID11 as a character string to be printed on the area A1 as the first delimiter area.

When specifying the character string MJ111 as a character string to be printed on the area A1 that is the first delimiter area, the printing apparatus processor 20 processes the character string MJ111 based on the style data of the delimiter string corresponding to the first delimiter area, which is designated by the setting command STC1 and stored in the style database 210, and develops the processed image data to the print buffer 23. As described above, the style data of the delimiter string corresponding to the first delimiter area specified by the setting command STC1 is the right align style data, the 1 margin style data, and the integer format style data. Therefore, by setting a blank space YK of one digit of the character string MJ111 to the end of the character string MJ111 in a form of a right alignment on the area A1, the printing apparatus processor 20 performs processing such that the character string MJ111 on the area A1 becomes a character string MJ11a illustrated in FIG. 6. The printing apparatus processor 20 develops the image data indicating the character string MJ11a indicating "QTY" to the print buffer 23.

In addition, the printing apparatus processor 20 specifies the character string to be printed on an area A2 that is the middle delimiter area from the line print data ID11. As illustrated in FIG. 3, the line print data ID11 is delimited by the tab command. In addition, as described above, the delimiter corresponds to the delimiter of the line by the tab position setting command. Accordingly, as the character string to be printed on the area A2 that is the middle delimiter area, the printing apparatus processor 20 specifies the character string MJ112 (delimiter string) from the line print data ID11.

When specifying the character string MJ112 as a character string to be printed on the area A2 that is the middle delimiter area, the printing apparatus processor 20 processes the character string MJ112 based on the style data of the delimiter string corresponding to the middle delimiter area, which is designated by the setting command STC1 and stored in the style database 210, and develops the processed image data to the print buffer 23. As described above, the style data of the delimiter string corresponding to the middle delimiter area specified by the setting command STC1 is the left align style data, the marginless style data, and the trimming format style data. Therefore, by trimming the character string MJ112 so that the number of the digits becomes equal to or less the number of digits of the area A2 in a form of a left alignment on the area A2 without setting the blank space YK, the printing apparatus processor 20 performs processing such that the character string MJ112 on the area A2 becomes a character string MJ11b illustrated in FIG. 6. The printing apparatus processor 20 develops the image data indicating the character string MJ11b indicating "ITME" to the print buffer 23.

In addition, the printing apparatus processor 20 specifies the character string to be printed on an area A3 that is the last delimiter area from the line print data ID11. As the character string to be printed on the area A3 that is the last delimiter area, the printing apparatus processor 20 specifies the character string MJ113 (delimiter string) from the line print data ID11.

When specifying the character string MJ113 as a character string to be printed on the area A3 that is the last delimiter area, the printing apparatus processor 20 processes the character string MJ113 based on the style data of the delimiter string corresponding to the last delimiter area, which is designated by the setting command STC1 and stored in the style database 210, and develops the processed image data to the print buffer 23. As described above, the style data of the delimiter string corresponding to the last delimiter area specified by the setting command STC1 is the right align style data, the 2 margin style data, and US currency format style data. Accordingly, by setting the blank space YK to the two ends in a form of the left alignment on the area A2 in the character string MJ113, the printing apparatus processor 20 performs processing such that the character string MJ113 becomes a character string MJ11c illustrated in FIG. 6 on the area A3. The printing apparatus processor 20 develops the image data indicating the character string MJ11c indicating "AMOUNT" to the print buffer 23.

Regarding the line print data ID11, when the printing apparatus processor 20 develops the image data to the print buffer 23 based on the setting by the tab position setting command TC1 and the setting command STC1 (step S5), the printing apparatus processor 20 reads the developed image data from the print buffer 23 by the line feed command <LF> and executes printing on the roll paper by controlling the printing mechanism 22 (step S6). Accordingly, a character string MJ11f including the character string MJ11a, the character string MJ11b, and the character string MJ11c is printed on the roll paper as one line in a format illustrated in FIG. 6.

When printing is executed based on the image data developed in the print buffer 23, the printing apparatus processor 20 deletes the image data developed in the print buffer 23 in preparation of the next line (step S7).

When printing of the line print data ID11 is executed, the printing apparatus processor 20 determines that printing of one or all of the plurality of line print data items included in the print data is not ended (step S8: NO), returns the processing to step S4, and specifies the next line feed command <LF> as the next line print data ID12.

When specifying the line print data ID12, as the delimiter string, the printing apparatus processor 20 specifies the character string to be printed on the area A1 that is the first delimiter area from the line print data ID12 by the tab command <HT>. As illustrated in FIG. 3, the line print data ID12 is delimited by the tab command. The delimiter corresponds to the delimiter of the line by the tab position setting command TC1. Accordingly, as the character string to be printed on the area A1 that is the first delimiter area, the printing apparatus processor 20 specifies the character string MJ121 (delimiter string) from the line print data ID12 by the tab command <HT>.

When specifying the character string MJ121 as a character string to be printed on the area A1 that is the first delimiter area, the printing apparatus processor 20 processes the character string MJ121 based on the style data of the delimiter string corresponding to the first delimiter area, which is designated by the setting command STC1, and develops the processed image data to the print buffer 23. As described above, the style data of the delimiter string corresponding to the first delimiter area specified by the setting command STC1, which is stored in the style database 210, is the right align style data, the 1 margin style data, and the integer format style data. Therefore, by setting a blank space YK of one digit of the character string MJ121 to the end of the character string MJ121 in a form of a right alignment on the area A1 and by setting the character string to be an integer format, the printing apparatus processor 20 performs processing such that the character string MJ121 on the area A1 becomes a character string MJ12*a* illustrated in FIG. 6. The printing apparatus processor 20 develops the image data indicating the character string MJ12*a* indicating "2" to the print buffer 23.

In addition, as the delimiter string, the printing apparatus processor 20 specifies the character string to be printed on the area A2 that is the middle delimiter area from the line print data ID12 by the tab command <HT>. As the character string to be printed on the area A2 that is the middle delimiter area, the printing apparatus processor 20 specifies the character string MJ122 (delimiter string) from the line print data ID12 by the tab command <HT>.

When specifying the character string MJ122 as a character string to be printed on the area A2 that is the middle delimiter area, the printing apparatus processor 20 processes the character string MJ122 based on the style data of the delimiter string corresponding to the middle delimiter area, which is designated by the setting command STC1 and stored in the style database 210, and develops the processed image data to the print buffer 23. As described above, the style data of the delimiter string corresponding to the middle delimiter area specified by the setting command STC1 is the left align style data, the marginless style data, and the trimming format style data. Therefore, by trimming the character string MJ122 so that the number of the digits becomes equal to or less the number of digits of the area A2 in a form of a left alignment on the area A2 without setting the blank space YK, the printing apparatus processor 20 performs processing such that the character string MJ122 on the area A2 becomes a character string MJ12*b* illustrated in FIG. 6. The printing apparatus processor 20 develops the image data indicating the character string MJ12*b* indicating "AAAA, BBBBBBB, and CCCCCC" to the print buffer 23.

In addition, as the delimiter string, the printing apparatus processor 20 specifies the character string to be printed on the area A3 that is the last delimiter area from the line print data ID12 by the tab command <HT>. As the character string to be printed on the area A3 that is the last delimiter area, the printing apparatus processor 20 specifies the character string MJ123 (delimiter string) from the line print data ID12 by the tab command <HT>.

When specifying the character string MJ123 as a character string to be printed on the area A3 that is the last delimiter area, the printing apparatus processor 20 processes the character string MJ123 based on the style data of the delimiter string corresponding to the last delimiter area, which is designated by the setting command STC1 and stored in the style database 210, and develops the processed image data to the print buffer 23. As described above, the style data of the delimiter string corresponding to the last delimiter area specified by the setting command STC1 is the right align style data, the 2 margin style data, and US currency format style data. Accordingly, by setting the blank space YK to the two ends in a form of the left alignment on the area A2 in the character string MJ123, and by setting the numerical value to be in the UC currency format, the printing apparatus processor 20 performs processing such that the character string MJ123 becomes a character string MJ12*c* illustrated in FIG. 6 on the area A3. The printing apparatus processor 20 develops the image data indicating the character string MJ12*c* indicating "12.00" to the print buffer 23.

Regarding the line print data ID12, when the printing apparatus processor 20 develops the image data to the print buffer 23 based on the setting by the tab position setting command TC1 and the setting command STC1 (step S5), the printing apparatus processor 20 reads the developed image data from the print buffer 23 by the line feed command <LF> and executes printing on the roll paper by controlling the printing mechanism 22 (step S6). Accordingly, a character string MJ12*f* including the character string MJ12*a*, the character string MJ12*b*, and the character string MJ12*c* is printed on the roll paper as one line in a format illustrated in FIG. 6.

When printing is executed based on the image data developed in the print buffer 23, the printing apparatus processor 20 deletes the image data developed in the print buffer 23 in preparation of the next line (step S7).

When printing of the line print data ID12 is executed, the printing apparatus processor 20 determines that printing of one or all of the plurality of line print data items included in the print data is not ended (step S8: NO), returns the processing to step S4, and specifies the next line feed command <LF> as the next line print data ID13.

When the printing apparatus processor 20 specifies the line print data ID13, as the delimiter string, the printing apparatus processor 20 specifies the character string to be printed on the area A1 that is the first delimiter area from the line print data ID13 by the tab command <HT>. As illustrated in FIG. 3, the line print data ID13 is delimited by the tab command. The delimiter corresponds to the delimiter of the line by the tab position setting command TC1. Accordingly, as the character string to be printed on the area A1 that is the first delimiter area, the printing apparatus processor 20 specifies the character string MJ131 (delimiter string) from the line print data ID13 by the tab command <HT>.

When specifying the character string MJ131 as a character string to be printed on the area A1 that is the first delimiter area, the printing apparatus processor 20 processes the character string MJ131 based on the style data of the delimiter string corresponding to the first delimiter area, which is designated by the setting command STC1, and develops the processed image data to the print buffer 23. As described above, the style data of the delimiter string corresponding to the first delimiter area specified by the setting command STC1 and stored in the style database 210 is the right align style data, the 1 margin style data, and the integer format style data. Therefore, by setting the blank space YK of one digit of the character string MJ131 to the end of the character string MJ131 in a form of a right alignment on the area A1 and by setting the character string to be an integer format, the printing apparatus processor 20 performs processing such that the character string MJ131 on the area A1 becomes a character string MJ13a illustrated in FIG. 6. The printing apparatus processor 20 develops the image data indicating the character string MJ13a indicating "1" to the print buffer 23.

In addition, the printing apparatus processor 20 specifies the character string to be printed on the area A2 that is the middle delimiter area from the line print data ID13. As the character string to be printed on the area A2 that is the middle delimiter area, the printing apparatus processor 20 specifies the character string MJ132 from the line print data ID13.

When specifying the character string MJ132 by the tab command <HT> as the delimiter string of the character string to be printed on the area A2 that is the middle delimiter area, the printing apparatus processor 20 processes the character string MJ132 based on the style data of the delimiter string corresponding to the middle delimiter area, which designed by the setting command STC1 and stored in the style database 210 and develops the processed image data to the print buffer 23. As described above, the style data of the delimiter string corresponding to the middle delimiter area specified by the setting command STC1 is the left align style data, the marginless style data, and the trimming format style data. Therefore, by trimming the character string MJ132 so that the number of the digits becomes equal to or less the number of digits of the area A2 in a form of a left alignment on the area A2 without setting the blank space YK, the printing apparatus processor 20 performs processing such that the character string MJ132 on the area A2 becomes a character string MJ13b illustrated in FIG. 6. The printing apparatus processor 20 develops the image data indicating the character string MJ13b indicating "Fresh Squeezed AAAAAA Juic" to the print buffer 23.

In addition, the printing apparatus processor 20 specifies the character string to be printed on an area A3 that is the last delimiter area as the delimiter string from the line print data ID13 by the tab command <HT>. As the character string to be printed on the area A3 that is the last delimiter area, the printing apparatus processor 20 specifies the character string MJ133 (delimiter string) from the line print data ID13 by the tab command <HT>.

When specifying the character string MJ133 as a character string to be printed on the area A3 that is the last delimiter area, the printing apparatus processor 20 processes the character string MJ133 based on the style data of the delimiter string corresponding to the last delimiter area, which is designated by the setting command STC1 and stored in the style database 210, and develops the processed image data to the print buffer 23. As described above, the style data of the delimiter string corresponding to the last delimiter area specified by the setting command STC1 is the right align style data, the 2 margin style data, and US currency format style data. Accordingly, by setting the blank space YK to the two ends in a form of the left alignment on the area A2 in the character string MJ133, and by setting the numerical value to be in the UC currency format, the printing apparatus processor 20 performs processing such that the character string MJ133 on the area A3 becomes a character string MJ13c illustrated in FIG. 6. The printing apparatus processor 20 develops the image data indicating the character string MJ13c indicating "6.00" to the print buffer 23.

Regarding the line print data ID13, when the printing apparatus processor 20 develops the image data to the print buffer 23 based on the setting by the tab position setting command TC1 and the setting command STC1 (step S5), the printing apparatus processor 20 reads the developed image data from the print buffer 23 by the line feed command <LF> and executes printing on the roll paper by controlling the printing mechanism 22 (step S6). Accordingly, a character string MJ13f including the character string MJ13a, the character string MJ13b, and the character string MJ13c is printed on the roll paper as one line in a format illustrated in FIG. 6.

When printing is executed based on the image data developed in the print buffer 23, the printing apparatus processor 20 deletes the image data developed in the print buffer 23 in preparation of the next line (step S7).

When printing of the line print data ID13 is executed, the printing apparatus processor 20 determines that printing of one or all of the plurality of line print data items included in the print data is not ended (step S8: NO), returns the processing to step S4, and specifies the next line feed command <LF> as the next line print data ID14.

When the printing apparatus processor 20 specifies the line print data ID14, as the delimiter string, the printing apparatus processor 20 specifies the character string to be printed on the area A1 that is the first delimiter area from the line print data ID14 by the tab command <HT>. As illustrated in FIG. 3, the line print data ID14 is delimited by the tab command. The delimiter corresponds to the delimiter of the line by the tab position setting command TC1. As illustrated in FIG. 3, the line print data ID14 does not include the character string to be printed on the area A1 that is the first delimiter area. Therefore, the printing apparatus processor 20 specifies that the character string to be printed on the area A1 that is the first delimiter area is not present in the line print data ID14.

When the printing apparatus processor 20 specifies that the character string to be printed on the area A2 that is the first delimiter area is not present in the line print data ID14, as the delimiter string, the printing apparatus processor 20 specifies the character string to be printed on the area A1 that is the middle delimiter area from the line print data ID14 by the tab command <HT>. As the character string to be printed on the area A2 that is the middle delimiter area, the printing apparatus processor 20 specifies the character string MJ141 (delimiter string) from the line print data ID14 by the tab command <HT>.

When specifying the character string MJ141 as a character string to be printed on the area A2 that is the middle delimiter area, the printing apparatus processor 20 processes the character string MJ141 based on the style data of the delimiter string corresponding to the middle delimiter area, which is designated by the setting command STC1 and stored in the style database 210, and develops the processed image data to the print buffer 23. As described above, the style data of the delimiter string corresponding to the middle delimiter area specified by the setting command STC1 is the left align style data, the marginless style data, and the trimming format style data. Therefore, by trimming the character string MJ141 so that the number of the digits becomes equal to or less the number of digits of the area A2 in a form of a left alignment on the area A2 without setting the blank space YK, the printing apparatus processor 20 performs processing such that the character string MJ141 on the area A2 becomes a character string MJ14*a* illustrated in FIG. 6. The printing apparatus processor 20 develops the image data of the character string MJ14*a* indicating "Subtotal" to the print buffer 23.

In addition, as the delimiter string, the printing apparatus processor 20 specifies the character string to be printed on the area A3 that is the last delimiter area from the line print data ID14 by the tab command <HT>. As the character string to be printed on the area A3 that is the last delimiter area, the printing apparatus processor 20 specifies the character string MJ142 (delimiter string) from the line print data ID14 by the tab command <HT>.

When specifying the character string MJ142 as a character string to be printed on the area A3 that is the last delimiter area, the printing apparatus processor 20 processes the character string MJ142 based on the style data of the delimiter string corresponding to the last delimiter area, which is designated by the setting command STC1 and stored in the style database 210, and develops the processed image data to the print buffer 23. As described above, the style data of the delimiter string corresponding to the last delimiter area specified by the setting command STC1 is the right align style data, the 2 margin style data, and US currency format style data. Accordingly, by setting the blank space YK to the two ends in a form of the left alignment on the area A2 in the character string MJ142, and by setting the numerical value to be in the UC currency format, the printing apparatus processor 20 performs processing such that the character string MJ142 on the area A3 becomes a character string MJ14*b* illustrated in FIG. 6. The printing apparatus processor 20 develops the image data indicating the character string MJ14*b* indicating "18.00" to the print buffer 23.

Regarding the line print data ID14, when the printing apparatus processor 20 develops the image data to the print buffer 23 based on the setting by the tab position setting command TC1 and the setting command STC1 (step S5), the printing apparatus processor 20 reads the developed image data from the print buffer 23 by the line feed command <LF> and executes printing on the roll paper by controlling the printing mechanism 22 (step S6). Accordingly, a character string MJ14*f* including the character string MJ14*a*, the character string MJ14*b*, and the character string MJ14*c* is printed on the roll paper as one line in a format illustrated in FIG. 6.

When printing is executed based on the image data developed in the print buffer 23, the printing apparatus processor 20 deletes the image data developed in the print buffer 23 in preparation of the next line (step S7).

When printing of the line print data ID14 is executed, the printing apparatus processor 20 determines that printing of one or all of the plurality of line print data items included in the print data is ended (step S8: YES), cuts the roll paper by the cutter at an appropriately position (step S9), and issues the receipt R1 illustrated in FIG. 6.

Figure 7:
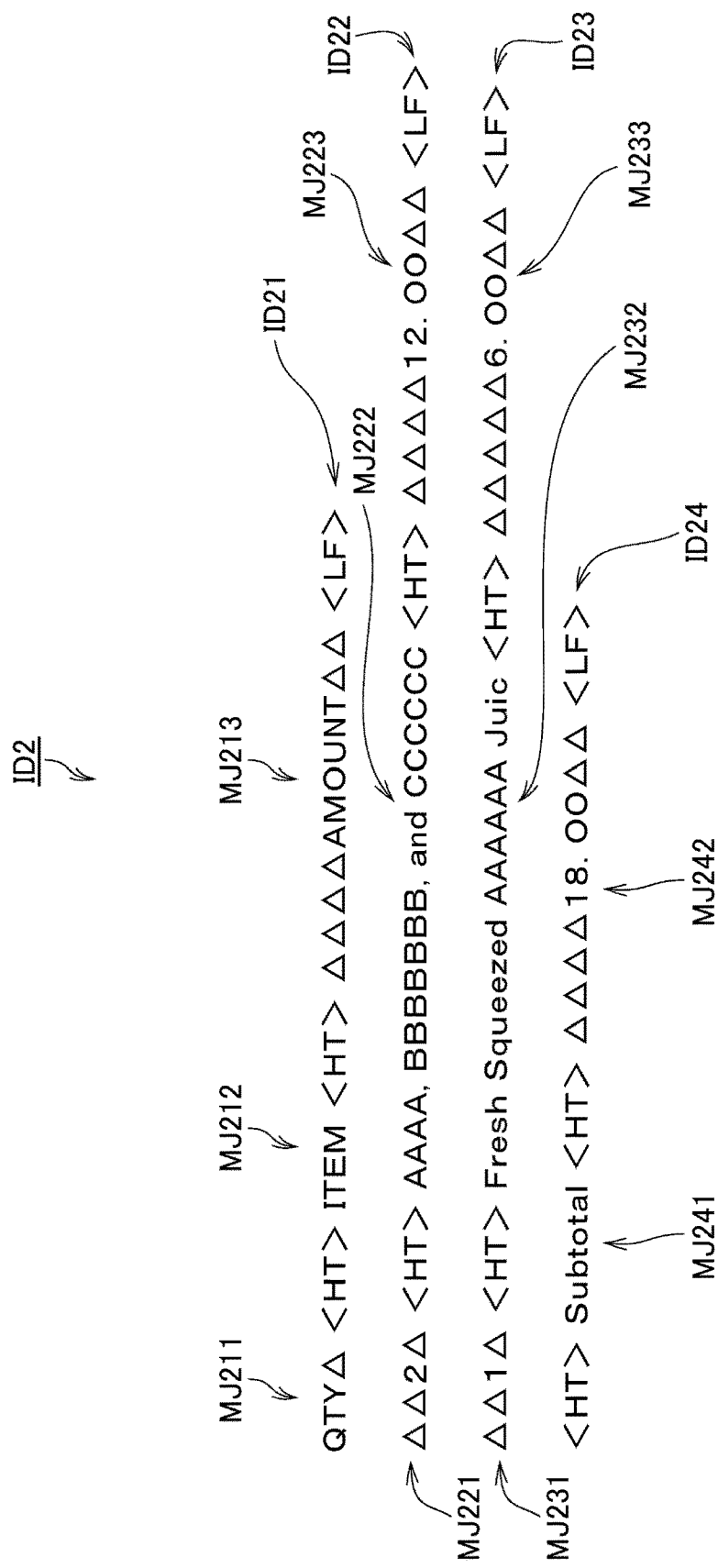
FIG. 7 is a diagram illustrating an example of the print data.

As described above, when the user desires to issue the receipt R1 illustrated in FIG. 6, in a case where the printer driver is not installed in the tablet terminal device 3, or in a case where the tablet terminal device 3 transmits the print data without involving the printer driver, it is necessary to change the print data ID1 illustrated in FIG. 3 to the print data ID2 illustrated in FIG. 7 on the application side.

FIG. 7 is a diagram illustrating an example of the print data.

The print data ID2 illustrated in FIG. 7 includes line print data ID21, line print data ID22, line print data ID23, and line print data ID24.

Each of the line print data ID21 to the line print data ID24 includes the tab command and the line feed command. In FIG. 7, the tab command is denoted as "<HT>". In addition, the line feed command is denoted as "<LF>".

The line print data ID21 includes a character string MJ211 indicating "QTYΔ", a character string MJ212 indicating "ITEM", and a character string MJ213 indicating "ΔΔΔAMOUNTΔΔ". The character string MJ211, the character string MJ212, and the character string MJ213 are delimited by the tab command. "Δ" in FIG. 7 indicates a blank character.

The line print data ID22 includes a character string MJ221 indicating "ΔΔ2Δ", a character string MJ222 indicating "AAAA, BBBBBBB, and CCCCCC", and a character string MJ223 indicating "ΔΔΔΔ12.00ΔΔ". The character string MJ221, the character string MJ222, and the character string MJ223 are delimited by the tab command <HT>.

The line print data ID23 includes a character string MJ231 indicating "ΔΔ1Δ", a character string MJ232 indicating "Fresh Squeezed AAAAAA Juic", and a character string MJ233 indicating "ΔΔΔΔ6.00ΔΔ". The character string MJ231, the character string MJ232, and the character string MJ233 are delimited by the tab command <HT>.

The line print data ID24 includes a character string MJ241 indicating "Subtotal" and a character string MJ242 indicating "ΔΔΔΔ18.00ΔΔ". The character string MJ241 and the character string MJ242 are delimited by the tab command <HT>.

As described above, in order to obtain the printing result illustrated in FIG. 6, it is necessary to change the print data ID1 illustrated in FIG. 3 to the print data ID2 illustrated in FIG. 7. That is, in order that the character string MJ111 on the area A1, the character string MJ121, and the character string MJ131 are in a form of right alignment, and in order to set the margin to the end of the character string, it is necessary to appropriately set the blank space as illustrated in the character string MJ211, the character string MJ221, and the character string MJ231. In addition, in order to make the character string MJ122 and the character string MJ132 as the character string with respect to the digit number of the area A2, it is necessary to trim the character string as the character string MJ222 and the character string MJ232. In addition, in order that the character string MJ113, the character string MJ123, and the character string MJ133 and the character string MJ142 on the area A3 are in a form of right alignment, and in order to set the margin to the end of the character string to form the predetermined format, it is necessary to appropriately set the blank space and set the format. It is necessary to perform complicate processing on the application side as shown in the character string MJ211, the character string MJ221, and the character string MJ231. Therefore, it takes time and labor of the user.

As described above, the printer 2 set the style of the delimiter string in the order of each delimiter area in advance based on the style data stored in the style database 210 by the setting command STC1 capable of setting and performs processing of the print data ID1 in correspondence with the delimiter string delimited in the order of the tab command. Therefore, the receipt R1 can be issued in a format desired by the user without taking the time and labor of the user. On the application side, if the style data is set once by the setting command STC1, at the time of printing, it is possible to print the receipt in a desired format by only generating and transmitting the character string delimited by the tab command.

Next, the other examples will be described.

Example 2

Figure 8:
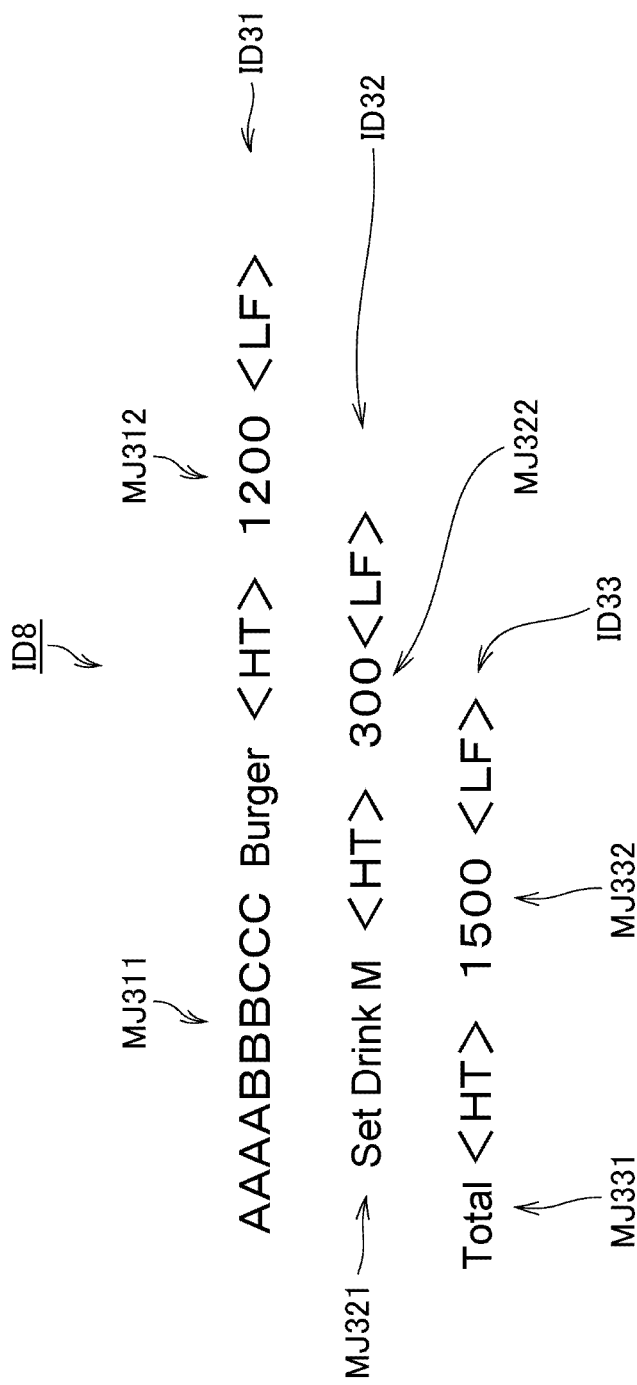
FIG. 8 is a diagram illustrating an example of the print data.
Figure 11:
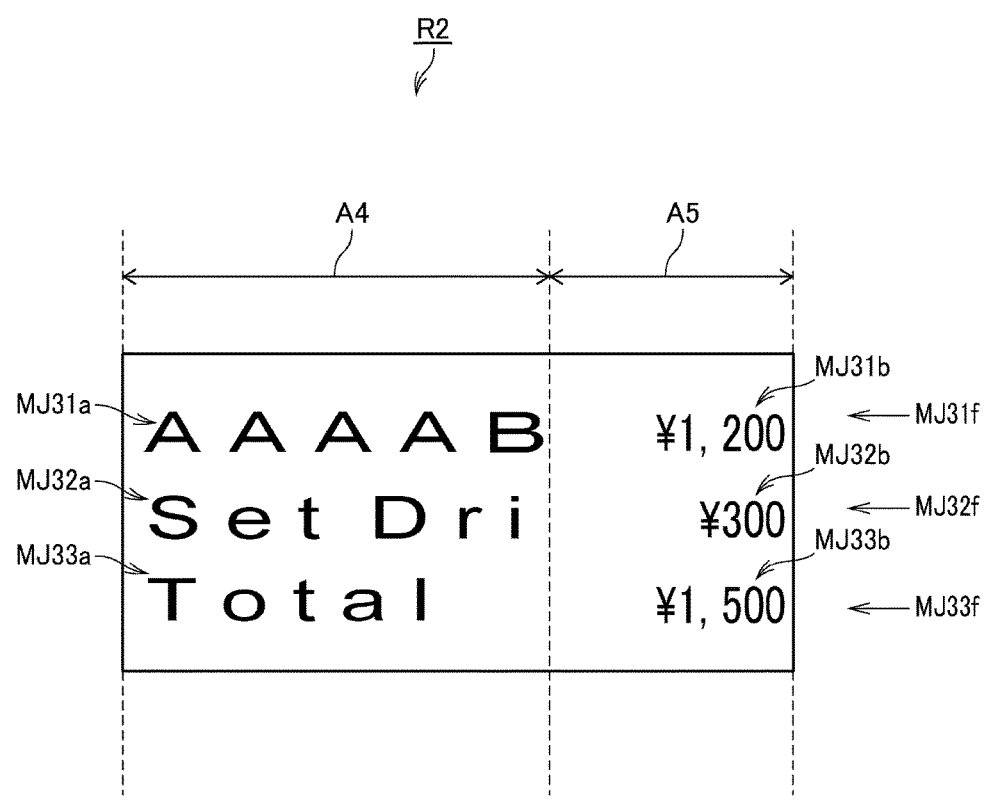
FIG. 11 is a diagram illustrating an example of the printing result.

In Example 2, a case where a receipt R2 illustrated in FIG. 11 is issued based on the print data ID3 illustrated in FIG. 8, a tab position setting command TC2 illustrated in FIG. 9, and a setting command STC2 illustrated in FIG. 10 will be exemplified. In Example 2, the number of digits printable by one line on the printing surface of the roll paper is set to 30 digits.

FIG. 8 is a diagram illustrating an example of the print data.

The print data ID3 illustrated in FIG. 8 includes line print data ID31, line print data ID32, and line print data ID33, and data items are delimited by the line feed command.

Each of the line print data ID31 to the line print data ID33 includes the tab command and the line feed command. In FIG. 8, the tab command is denoted as "<HT>". In addition, the line feed command is denoted as "<LF>".

The line print data ID31 includes a character string MJ311 indicating "AAAABBBCCC Burger" and a character string MJ312 indicating "1200". The character string MJ311 and the character string MJ312 are delimited by the tab command. Accordingly, each of the character string MJ311 and the character string MJ312 corresponds to the delimiter string in which the character string indicated by the line print data ID31 is delimited by the tab command. The character string indicated by the line print data ID31 is a character string including the character string MJ311 and the character string MJ312.

The line print data ID32 includes a character string MJ321 indicating "Set Drink M" and a character string MJ322 indicating "300". The character string MJ321 and the character string MJ322 are delimited by the tab command. Accordingly, each of the character string MJ321 and the character string MJ322 corresponds to the delimiter string in which the character string indicated by the line print data ID32 is delimited by the tab command. The character string indicated by the line print data ID32 is a character string including the character string MJ321 and the character string MJ322.

The line print data ID33 includes a character string MJ331 indicating "Total" and a character string MJ332 indicating "1500". The character string MJ331 and the character string MJ332 are delimited by the tab command. Accordingly, each of the character string MJ331 and the character string MJ332 corresponds to the delimiter string in which the character string indicated by the line print data ID33 is delimited by the tab command. The character string indicated by the line print data ID33 is a character string including the character string MJ331 and the character string MJ332.

FIG. 9 is a diagram illustrating an example of the tab position setting command.

The tab position setting command TC2 illustrated in FIG. 9 includes a setting value indicating the number of digits from the left end of the line to the tab position to be set on the area of one line on the printing surface of the roll paper. The number of digits here is the number of digits in a case where the characters are printed in half size. As illustrated in FIG. 9, the tab position setting command TC2 includes <ESC> indicating that it is a command, "'D'" indicating that this command is a tab position setting command, and a setting value ST3 indicating "21". That is, the tab position setting command TC2 illustrated in FIG. 9 is a command for instructing setting of the tab position to the twenty-first digit from the left end of the line on the area of the one line in the printing surface. That is, since the tab position setting command TC2 illustrated in FIG. 9 has 30 digits that can be printed by one line in Example 2, the tab position setting command TC2 corresponds to the command for instructing delimiting of the area of the line into an area from first digit to the twentieth digit and an area from the twenty-first digit to the thirtieth digit. These delimiter areas correspond to the delimiter areas indicating the areas of the lines delimited by the tab positions.

FIG. 10 is a diagram illustrating an example of a setting command.

The setting command STC2 illustrated in FIG. 10 includes a style setting value. The setting command STC2 illustrated in FIG. 10 includes the <ESC> indicating that it is the command, the "'X'" indicating that this command is a command designating the style, and a style setting value SS4 indicating "LN(2Y) (1T)S" and a style setting value SS5 indicating "RE(1Y) (1Y)¥" in the order of the corresponding delimiter string.

The style setting value SS4 indicating "LN(2Y) (1T)S" is configured of a plurality of style setting values. That is, the style setting value SS4 indicating "LN(2Y) (1T)S" is configured of a style setting value indicating "L", a style setting value indicating "N", a style setting value indicating "2Y", a style setting value indicating "1T", and a style setting value indicating "S". The style setting value indicating "L" is a setting value for designating left align style data. In addition, the style setting value indicating "N" is a setting value for designating style data (hereinafter, referred to as "non-decoration style data") that does not provide the predetermined decoration to the delimiter string in the delimiter area. In addition, the style setting value indicating "2Y" is a setting value for designating style data (hereinafter, referred to as "double width size style data") for setting the character size of the delimiter string to the horizontal double size in the delimiter area. The double width size is to make the size of the character twice as large as the half size in the line direction (horizontal direction). The style setting value indicating "1T" is a setting value for designating style data (hereinafter, referred to as "single height size style data") for setting the character size of the delimiter string to single height size in the delimiter area. The single height size is to make the size of the character once as large as the half size in the direction orthogonal to the line direction (vertical direction). The style setting value indicating "S" is the setting value for designating trimming style data.

The style setting value SS5 indicating "RE(1Y) (1Y) ¥" is configured of a plurality of style setting values. That is, the style setting value SS5 indicating "RE(1Y) (1Y) ¥" is configured of a style setting value indicating "R", a style setting value indicating "E", a style setting value indicating "1Y", a style setting value indicating "1T", and a style setting value indicating "¥". The style setting value indicating "R" is a setting value for designating right align style data. In addition, the style setting value indicating "E" is a setting value for designating style data (hereinafter, referred to as "emphasizing style data") that performs a predetermined emphasizing of the delimiter string in the delimiter area. In addition, the style setting value indicating "1Y" is a setting value for designating style data (hereinafter, referred to as "single height size style data") for setting the character size of the delimiter string to single width size in the delimiter area. The single width size is to make the size of the character once as large as the half size in the direction orthogonal to the line direction. The style setting value indicating "1T" is the setting value for designing the single width size style data. In a case where the delimiter string is the numerical value, the style setting value indicating "¥" is a setting value for designating style data (hereinafter, referred to as "Japanese currency style data") for setting the numerical value to Japanese currency format in the delimiter area.

As indicated by the setting command STC2 illustrated in FIG. 10, the style setting value SS4 and style setting value SS5 are delimited by ";". ";" corresponds to the tab position set by the tab position setting command TC2. It indicates that the style setting value SS4 designates the style data of the delimiter string corresponding to the first delimiter area among the delimiter areas delimited by the tab position setting command TC2. In addition, it indicates that the style setting value SS5 designates the style data of the delimiter string corresponding to the last delimiter area among the delimiter areas delimited by the tab position setting command TC2.

The description will be given with reference to FIG. 2. When the setting command STC2 is received from the tablet terminal device 3 (step S1: YES), the printing apparatus processor 20 reads the setting command STC2 from the receive buffer 24 and stores the style data items designated by the setting command STC2 in association with the tab position information items stored in the printing apparatus memory device 21, respectively (step S2). In this case, the tab position setting command TC1 may be firstly received and the tab position information may be set in advance. The tab position information set by the tab position setting command TC1 is stored in the printing apparatus memory device 21. The information on an initial value of the tab position is stored in advance in the printing apparatus memory device 21. As described above, the setting command STC2 includes the style setting value SS4 and the style setting value SS5.

Accordingly, the printing apparatus processor 20 reads and acquires the left align style data, the non-decoration style data, the double width size style data, the single height size style data, the trimming data, and the corresponding tab position information from the style database 210 stored in the printing apparatus memory device 21 based on the style setting value SS4. In addition, the printing apparatus processor 20 reads and acquires the right align style data, the emphasizing style data, the single width size style data, the single height size style data, the Japanese currency style data, and the corresponding tab position information from the style database 210 stored in the printing apparatus memory device 21 based on the style setting value SS5.

In a case where it is determined that the print data is received from the tablet terminal device 3 (step SA1: YES), when the printing apparatus processor 20 reads the print data ID3 received from the tablet terminal device 3 from the receive buffer 24 (step S3), each data is specified as line print data to be processed in step S5 to step S7 by the line feed command <LF> among the line print data ID31 to the line print data ID33 included in the print data ID3 (step S4).

In a case where the print data ID3 is read from the receive buffer 24 and the line print data is firstly specified, first, the printing apparatus processor 20 specifies the first line feed command <LF> as the line print data ID31.

Subsequently, the printing apparatus processor 20 generates image data based on the tab position information stored in the printing apparatus memory device 21 based on the tab position setting command TC2, the style data stored in the style database 210 based on the setting command STC2, and the line print data ID31 including the tab command specified in step S4, and develops the image data to the print buffer 23 (step S5).

Here, step S5 will be described in detail.

FIG. 11 is a diagram illustrating an example of a printing result, and particularly, illustrating a printing result based on the print data ID3 illustrated in FIG. 9, the tab position setting command TC2 illustrated in FIG. 8, and the setting command STC2 illustrated in FIG. 10.

The printing apparatus processor 20 specifies the first delimiter area, the middle delimiter area, and the last delimiter area based on the tab position setting command TC2. As described above, the tab position setting command TC2 is a command instructing setting of the tab position to the twenty-first digit from the beginning of the line, and the tab position information is stored in the printing apparatus memory device 21. The printing apparatus processor 20 specifies an area from the left end, which is the beginning of the line, to the twentieth digit, that is, from the left end of the line to the first tab position as the first delimiter area. In a case of FIG. 11, the printing apparatus processor 20 specifies an area A4 as the first delimiter area. In addition, the printing apparatus processor 20 specifies an area from the twenty-first digit of the line to the right end of the line, that is, an area from the first tab position to the termination of the line as the last delimiter area. In this case, the first tab position corresponds to the last tab position. In the case of FIG. 10, the printing apparatus processor 20 specifies an area A5 as the last delimiter area.

Subsequently, the printing apparatus processor 20 specifies the character string (delimiter string) to be printed on the area A1 that is the first delimiter area from the line print data ID31 by the tab command <HT>. As illustrated in FIG. 3, the line print data ID31 is delimited by the tab command for sequentially moving the printing position based on the tab position information stored in the printing apparatus memory device 21. The printing apparatus processor 20 sequentially moves positions (memory addresses) to be developed in the print buffer 23 by the tab command <HT>, and reflects the positions in the printing result. The delimiter corresponds to the delimiter of the line by the tab position setting command. Accordingly, as the character string to be printed on the area A4 that is the first delimiter area, the printing apparatus processor 20 specifies the character string MJ311 (delimiter string) from the line print data ID31.

When specifying the character string MJ311 as a character string to be printed on the area A4 that is the first delimiter area, the printing apparatus processor 20 processes the character string MJ311 based on the style data of the delimiter string corresponding to the first delimiter area, which is designated by the setting command STC2 and stored in the style database 210, and develops the processed image data to the print buffer 23. As described above, the style data of the delimiter string corresponding to the first delimiter area specified by the setting command STC2 is the left align style data, the non-decoration style data, the double width size style data, the single height size style data, and the trimming style data. Accordingly, the printing apparatus processor 20 performs trimming such that in the character string MJ311, the characters are in a form of the left alignment, a predetermined decoration is not provided, the character size is the single height size of the double width size, and the number of digits is equal to or less than the number of printable digits on the area A4 in a case where the character size is the single height size of the double width size. Accordingly, the printing apparatus processor 20 performs processing such that the character string MJ311 on the area A4 becomes the character string MJ31a indicating "AAAAB" of FIG. 11. The printing apparatus processor 20 develops the image data indicating the character string MJ31a to the print buffer 23.

In addition, the printing apparatus processor 20 specifies the character string to be printed on an area A5 that is the last delimiter area from the line print data ID31. As the character string to be printed on the area A5 that is the last delimiter area, the printing apparatus processor 20 specifies the character string MJ312 (delimiter string) from the line print data ID31.

When specifying the character string MJ312 as a character string to be printed on the area A5 that is the last delimiter area, the printing apparatus processor 20 processes the character string MJ312 based on the style data of the delimiter string corresponding to the last delimiter area, which is designated by the setting command STC2 and stored in the style database 210, and develops the processed image data to the print buffer 23. As described above, the style data of the delimiter string corresponding to the last delimiter area specified by the setting command STC2 is the right align style data, the emphasizing style data, the single width size style data, the single height size style data, and the Japanese currency format style data. Accordingly, the printing apparatus processor 20 performs setting such that in the character string MJ312, the characters are in a form of the right alignment, a predetermined emphasizing is provided, the character size is the single height size of the single width size, and the format becomes a Japanese yen format. Accordingly, the printing apparatus processor 20 performs processing such that the character string MJ312 on the area A5 becomes the character string MJ31b illustrated FIG. 11. The printing apparatus processor 20 develops the image data of the character string 31b indicating "¥1,200" to the print buffer 23.

Regarding the line print data ID31, when the printing apparatus processor 20 develops the image data to the print buffer 23 based on the setting by the tab position setting command TC2 and the setting command STC2 (step S5), the printing apparatus processor 20 reads the developed image data from the print buffer 23 by the line feed command <LF> and executes printing on the roll paper by controlling the printing mechanism 22 (step S6). Accordingly, a character string MJ31f including the character string MJ31a and the character string MJ31b is printed on the roll paper as one line in a format illustrated in FIG. 11.

When printing is executed based on the image data developed in the print buffer 23, the printing apparatus processor 20 deletes the image data developed in the print buffer 23 in preparation of the next line (step S7).

When printing of the line print data ID31 is executed, the printing apparatus processor 20 determines that printing of one or all of the plurality of line print data items included in the print data is not ended (step S8: NO), returns the processing to step S4, and specifies the next line feed command <LF> as the next line print data ID32.

When the printing apparatus processor 20 specifies the line print data ID32, as the delimiter string, the printing apparatus processor 20 specifies the character string to be printed on the area A4 that is the first delimiter area from the line print data ID32 by the tab command <HT>. As illustrated in FIG. 8, the line print data ID32 is delimited by the tab command. The delimiter corresponds to the delimiter of the line by the tab position setting command. Accordingly, as the character string to be printed on the area A4 that is the first delimiter area, the printing apparatus processor 20 specifies the character string MJ321 (delimiter string) from the line print data ID32 by the tab command <HT>.

When specifying the character string MJ321 as a character string to be printed on the area A4 that is the first delimiter area, the printing apparatus processor 20 processes the character string MJ321 based on the style data of the delimiter string corresponding to the first delimiter area, which is designated by the setting command STC2 and stored in the style database 210, and develops the processed image data to the print buffer 23. As described above, the style data of the delimiter string corresponding to the first delimiter area specified by the setting command STC2 and stored in the style database 210 is the left align style data, the non-decoration style data, the double width size style data, the single height size style data, and the trimming style data. Accordingly, the printing apparatus processor 20 performs trimming such that in the character string MJ321, the characters are in a form of the left alignment, a predetermined decoration is not provided, the character size is the single height size of the double width size, and the number of digits is equal to or less than the number of printable digits on the area A4 in a case where the character size is the single height size of the double width size. Accordingly, the printing apparatus processor 20 performs processing such that the character string MJ321 on the area A4 becomes the character string MJ32a indicating "Set-D" of FIG. 11. The printing apparatus processor 20 develops the image data indicating the character string MJ32a to the print buffer 23.

In addition, as the delimiter string, the printing apparatus processor 20 specifies the character string to be printed on an area A5 that is the last delimiter area from the line print data ID32 by the tab command <HT>. As the character string to be printed on the area A5 that is the last delimiter area, the printing apparatus processor 20 specifies the character string MJ322 (delimiter string) from the line print data ID32 by the tab command <HT>.

When specifying the character string MJ322 as a character string to be printed on the area A5 that is the last delimiter area, the printing apparatus processor 20 processes the character string MJ322 based on the style data of the delimiter string corresponding to the last delimiter area, which is designated by the setting command STC2 and stored in the style database 210, and develops the processed image data to the print buffer 23. As described above, the style data of the delimiter string corresponding to the last delimiter area specified by the setting command STC2 is the right align style data, the emphasizing style data, the single width size style data, the single height size style data, and the Japanese currency format style data. Accordingly, the printing apparatus processor 20 performs setting such that in the character string MJ322, the characters are in a form of the right alignment, a predetermined emphasizing is provided, the character size is the single height size of the single width size, and the format becomes a Japanese yen format. Accordingly, the printing apparatus processor 20 performs processing such that the character string MJ322 on the area A5 becomes the character string MJ32b indicating "¥300" of FIG. 11. The printing apparatus processor 20 develops the image data of the character string 32b to the print buffer 23.

Regarding the line print data ID32, when the printing apparatus processor 20 develops the image data to the print buffer 23 based on the setting by the tab position setting command TC2 and the setting command STC2 (step S5), the printing apparatus processor 20 reads the developed image data from the print buffer 23 by the line feed command <LF> and executes printing on the roll paper by controlling the printing mechanism 22 (step S6). Accordingly, a character string MJ32f including the character string MJ32a and the character string MJ32b is printed on the roll paper as one line in a format illustrated in FIG. 11.

When printing is executed based on the image data developed in the print buffer 23, the printing apparatus processor 20 deletes the image data developed in the print buffer 23 in preparation of the next line (step S7).

When printing of the line print data ID32 is executed, the printing apparatus processor 20 determines that printing of one or all of the plurality of line print data items included in the print data is not ended (step S8: NO), returns the processing to step S4, and specifies the next line feed command <LF> as the next line print data ID33.

When the printing apparatus processor 20 specifies the line print data ID33, as the delimiter string, the printing apparatus processor 20 specifies the character string to be printed on the area A4 that is the first delimiter area from the line print data ID33 by the tab command <HT>. As illustrated in FIG. 8, the line print data ID33 is delimited by the tab command. The delimiter corresponds to the delimiter of the line by the tab position setting command. Accordingly, as the character string to be printed on the area A4 that is the first delimiter area, the printing apparatus processor 20 specifies the character string MJ331 (delimiter string) from the line print data ID33 by the tab command <HT>.

When specifying the character string MJ331 as a character string to be printed on the area A4 that is the first delimiter area, the printing apparatus processor 20 processes the character string MJ331 based on the style data of the delimiter string corresponding to the first delimiter area which is designated by the setting command STC2 and stored in the style database 210, and develops the processed image data to the print buffer 23. As described above, the style data of the delimiter string corresponding to the first delimiter area specified by the setting command STC2 is the left align style data, the non-decoration style data, the double width size style data, the single height size style data, and the trimming style data. Accordingly, the printing apparatus processor 20 performs trimming such that in the character string MJ331, the characters are in a form of the left alignment, a predetermined decoration is not provided, the character size is the single height size of the double width size, and the number of digits is equal to or less than the number of printable digits on the area A4 in a case where the character size is the single height size of the double width size. Accordingly, the printing apparatus processor 20 performs processing such that the character string MJ331 on the area A4 becomes the character string MJ33a indicating "Total" of FIG. 11. The printing apparatus processor 20 develops the image data indicating the character string MJ33a to the print buffer 23.

In addition, the printing apparatus processor 20 specifies the character string to be printed on an area A5 that is the last delimiter area from the line print data ID33. As the character string to be printed on the area A5 that is the last delimiter area, the printing apparatus processor 20 specifies the character string MJ332 from the line print data ID33.

When specifying the character string MJ332 by the tab command <HT> as the delimiter string of the character string to be printed on the area A5 that is the last delimiter area, the printing apparatus processor 20 processes the character string MJ332 based on the style data of the delimiter string corresponding to the last delimiter area, which designed by the setting command STC2 and stored in the style database 210 and develops the processed image data to the print buffer 23. As described above, the style data of the delimiter string corresponding to the last delimiter area specified by the setting command STC2 is the right align style data, the emphasizing style data, the single width size style data, the single height size style data, and the Japanese currency format style data. Accordingly, the printing apparatus processor 20 performs setting such that in the character string MJ332, the characters are in a form of the right alignment, a predetermined emphasizing is provided, the character size is the single height size of the single width size, and the format becomes a Japanese yen format. Accordingly, the printing apparatus processor 20 performs processing such that the character string MJ332 on the area A5 becomes the character string MJ33b indicating "¥1,500" of FIG. 11. The printing apparatus processor 20 develops the image data indicating the character string MJ33b to the print buffer 23.

Regarding the line print data ID33, when the printing apparatus processor 20 develops the image data to the print buffer 23 based on the setting by the tab position setting command TC2 and the setting command STC2 (step S5), the printing apparatus processor 20 reads the developed image data from the print buffer 23 by the line feed command <LF> and executes printing on the roll paper by controlling the printing mechanism 22 (step S6). Accordingly, a character string MJ33f including the character string MJ33a and the character string MJ33b is printed on the roll paper as one line in a format illustrated in FIG. 11.

When printing is executed based on the image data developed in the print buffer 23, the printing apparatus processor 20 deletes the image data developed in the print buffer 23 in preparation of the next line (step S7).

When printing of the line print data ID33 is executed, the printing apparatus processor 20 determines that printing of one or all of the plurality of line print data items included in the print data ID3 is ended (step S8: YES), cuts the roll paper by the cutter at an appropriately position (step S9), and issues the receipt R2 illustrated in FIG. 11.

Figure 12:
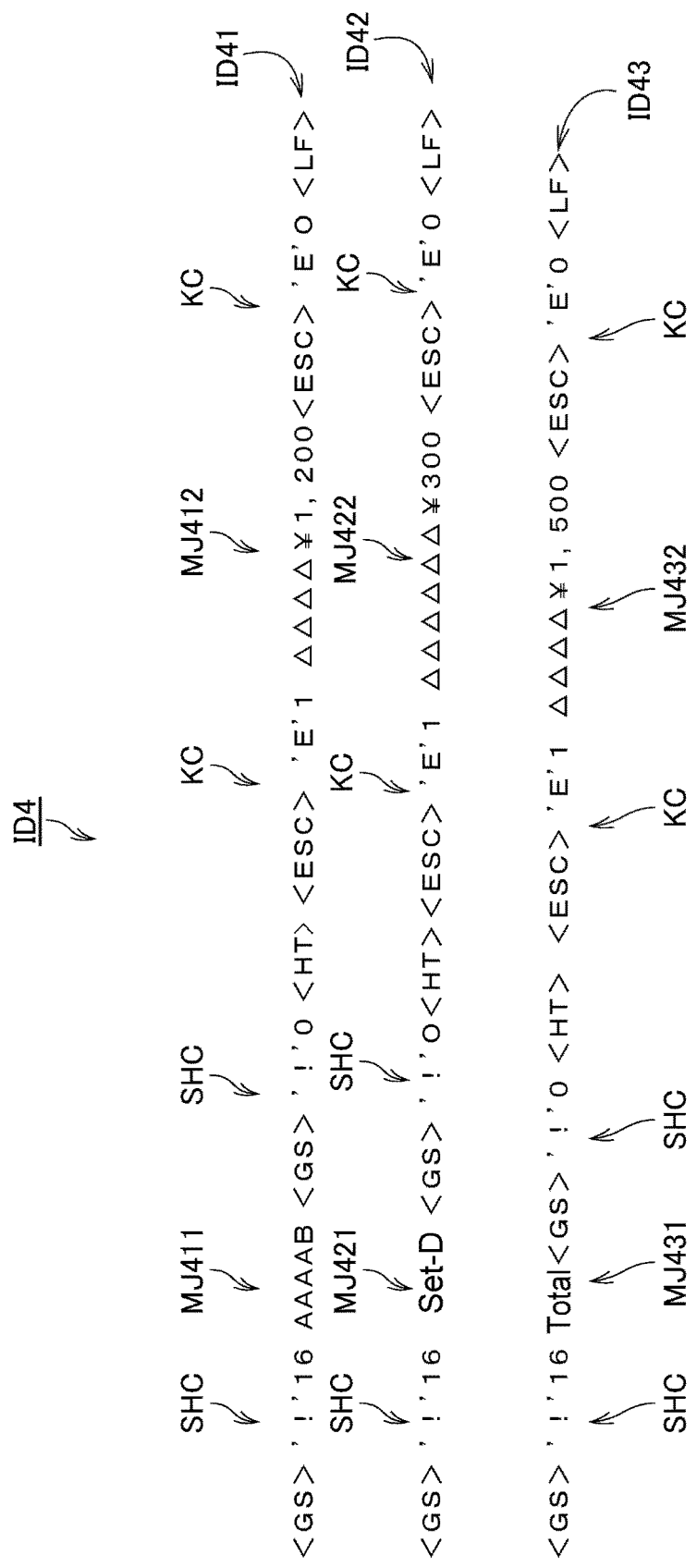
FIG. 12 is a diagram illustrating an example of the print data.

As described above, when the user desires to issue the receipt R2 illustrated in FIG. 11, in a case where the printer driver is not installed in the tablet terminal device 3, or in a case where the tablet terminal device 3 transmits the print data without involving the printer driver, it is necessary to change the print data ID3 illustrated in FIG. 8 to the print data ID4 illustrated in FIG. 12 on the application side.

FIG. 12 is a diagram illustrating an example of the print data.

The print data ID4 illustrated in FIG. 12 includes line print data ID41, line print data ID42, and line print data ID43.

Each of the line print data ID41 to the line print data ID43 includes the tab command and the line feed command. In FIG. 9, the tab command is denoted as "<HT>". In addition, the line feed command is denoted as "<LF>".

The line print data ID41 includes a character string MJ411 indicating "AAAAB" and a character string MJ412 indicating "ΔΔΔΔ¥1,200". The character string MJ411 and the character string MJ412 are delimited by the tab command. "Δ" in FIG. 12 indicates a blank character. In addition, the line print data ID41 includes a character size setting command SHC for setting the size of the character. The character size setting command SHC included in the line print data ID41 includes <GS> indicating that it is the command, "!" indicating the command is a command for setting the character size, and "16" indicating the double width size, and is a command instructing printing of the next character string MJ411 in a size of the double width size. In addition, the line print data ID41 includes an emphasizing command KC indicating that the character is emphasized and printed.

The emphasizing command KC included in the line print data ID41 includes <ESC> indicating that it is a command, "'E'" indicating that the command is a command for setting that the character is emphasized, and "1" indicating a predetermined emphasizing such as a bold, and a command instructing execution of the predetermined emphasizing to the next character string MJ412.

The line print data ID42 includes a character string MJ421 indicating "Set-D" with five characters in advance and a character string MJ422 indicating "ΔΔΔΔΔ¥ 300". The character string MJ421 and the character string MJ422 are delimited by tab commands. In addition, the line print data ID42 includes the character size setting command SHC. The character size setting command SHC included in the line print data ID42 is a command instructing printing of the character string MJ421 in the double width size. In addition, the line print data ID42 includes the emphasizing command KC. The emphasizing command KC included in the line print data ID42 is a command instructing performing of the predetermined emphasizing to the character string MJ422.

The line print data ID43 includes a character string MJ431 indicating "Total" and a character string MJ432 indicating "ΔΔΔ¥1,500". The character string MJ431 and the character string MJ432 are delimited by the tab command. In addition, the line print data ID43 includes a character size setting command SHC. The character size setting command SHC included in the line print data ID43 is a command instructing printing of the character string MJ431 in a size of the double width size. In addition, the line print data ID43 includes the emphasizing command KC. The emphasizing command KC included in the line print data ID43 is a command instructing execution of the predetermined emphasizing to the character string MJ432.

As described above, in order to obtain the printing result illustrated in FIG. 12, it is necessary to change the print data illustrated in FIG. 8 to the print data illustrated in FIG. 12. That is, in order to make the sizes of the character string MJ311, the character string MJ321, and the character string MJ331 becomes the double width size on the area A4 and becomes the character strings corresponding to the number of digits on the area A4, it is necessary to trim the character string such as the character string MJ411 and the character string MJ421, and to insert the character size setting command SHC into the line print data ID41 to the line print data ID43. In addition, in order to make the character string MJ312, the character string MJ322, and the character string MJ332 being in a form of the right alignment on the area A5 and being the Japanese currency format, and to perform the predetermined emphasizing, it is necessary to appropriately set the blank space, set the character string such that the format is the Japanese currency format, and inset the emphasizing command KC into the line print data ID41 to the line print data ID43, respectively as shown in the character string MJ412, the character string MJ422, and the character string MJ432. In this case, it is necessary to perform processing for each line on the application side, the processing is complicated, and it takes the time and labor of the user.

By processing the print data ID3 into which the tab command for designating the desired delimiter area is inserted based on the stored style data by the setting command STC2 which can set the style of the delimiter string for each delimiter area, the printer 2 can issue the receipt R2 in a format desired by the user without taking the time and labor of the user. The setting command STC2 may be transmitted only once, and thereafter, when transmitting the print data ID3 into which the tab command is inserted, printing can be performed in the desired style.

As described in Example 1 and Example 2, the printer 2 stores the style data by the setting command which can set the style (format) of the delimiter string and processes the print data for each corresponding delimiter area based on the print data and the tab command into which the print data is inserted. Therefore, the receipt can be issued in a format desired by the user. In particular, the application may only transmit the tab command to the printer 2 in the character string of the product name acquired by referring to a product master from the product code input from the user by operating the tablet terminal device 3, the number of products, or the like. The tab is set in advance at a desired position by the tab position setting command, and printing can be performed in a desired format set at the corresponding position and the range by the setting command. There is no need to take the time and labor of transmitting the command designating the style for each line in the application (user). The setting command corresponding to the tab position setting command is a setting command for setting the tab position by the tab position setting command and setting the style corresponding to each of the delimiter areas delimited and configured by the tab position. Accordingly, in a case where the printer driver is not installed in the tablet terminal device 3 or in a case where the tablet terminal device 3 transmits the print data without involving the printer driver, the receipt can be issued in a format desired by the user without taking the time and labor of the user.

In addition, as described in Example 1 and Example 2, the printing apparatus processor 20 sets the area from the left end of the line to the first tab position as the first delimiter area and the area from the last tab position to the right end of the line as the last delimiter area, based on the tab position set by the tab position setting command. As described above, by setting the first delimiter area and the last delimiter area, the printing apparatus processor 20 can appropriately print the line print data to be printed by one line, by one line, and can perform printing in a format desired by the user. For example, in a case where the first delimiter area is not set, the printing apparatus processor 20 cannot easily determine which delimiter area is the first delimiter area, and for example, there is a possibility in that the printing apparatus processor 20 starts printing by spacing one delimiter area, and printing is executed in a format different from the format desired by the user such as the character string included in the line print data does not fit in one line. In addition, in a case where the last delimiter area is not set, the printing apparatus processor 20 cannot easily determine which delimiter area is the last delimiter area, and for example, there is a possibility in that printing is executed in the format different from the format desired by the user such as the case that the line print data to be printed originally in one line is divided into a plurality of lines. As described above, in a configuration in which the delimiter string is processed in the style data for each of the delimiter areas, by setting the first delimiter area and the last delimiter area, the line print data to be printed in one line can be appropriately printed in one line and can be printed in the format desired by the user.

As described above, the character string indicating the amount of money is printed on the receipt in the right side of the printing surface of the roll paper, and the character string indicating what amount of money such as the product name is printed on the receipt in the left side of the printing surface of the roll paper. However, here is a character string which may be printed without specifying the right side, the left side, the center side, or the like of the printing surface of the roll paper depending on the character string. Such character strings include, for example, a name of a business state of issuing a receipt, a name of a person in charge of a cash register on which a printer issuing a receipt is mounted, a character string indicating predetermined notification information, and the like.

In a case where the tab position is not set by the tab position setting command, the printing apparatus processor 20 executes the processing based on the style data as a delimiter area from the left end to the right end of the line. Accordingly, if the tab position is not set by the tab position setting command, the character string which can be printed without specifying the right side, the left side, the center side, or the like of the printing surface of the roll paper can be printed on the line. Therefore, the user can print such the character string processed based on the style data on the roll paper without specifying the printing position, without setting the tab position. That is, by executing the processing based on the style data as the delimiter area from the left end and to the right end of the line in a case where the tab position is not set, the printing apparatus processor 20 can perform printing in a format desired by the user without taking the time and labor of the user.

In addition, it is considered that depending on the tab position setting command, the tab position is set at a position where the number of digits exceeds the number of digits printable by one line. In such a case, the printing apparatus processor 20 executes processing such that the printing result becomes a plurality of lines.

The above matter will be described in detail. Here, the number of digits printable by one line is described as 30 digits in detail.

Figure 13:
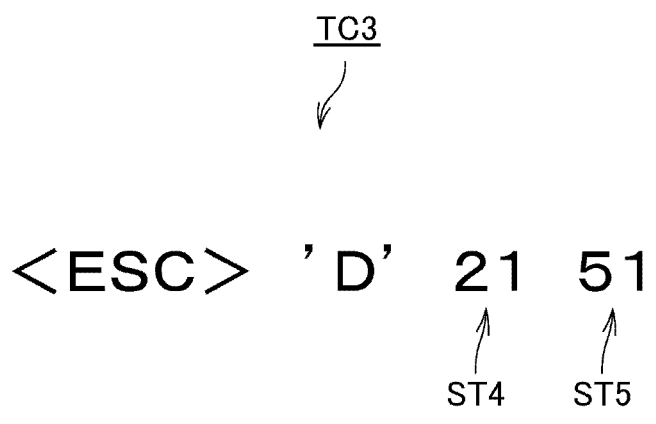

FIG. 13 is a diagram illustrating an example of the tab position setting command.

A tab position setting command TC3 illustrated in FIG. 13 includes a setting value indicating the number of digits from the left end of the line to the tab position to be set on the area of one line on the printing surface of the roll paper. The number of digits here is the number of digits in a case where the characters are printed in half size. As illustrated in FIG. 13, the tab position setting command TC3 includes <ESC> indicating that it is a command, "'D'" indicating that this command is a tab position setting command, a setting value ST4 indicating "21", and a setting value ST5 indicating "51". That is, the tab position setting command TC3 illustrated in FIG. 13 is a command for instructing setting of the tab position to the twenty-first digit and the fifty-first digit, from the left end of area of the one line on the printing surface.

However, since the number of digits printable by one line is set to 30 digits, the tab position indicated by the setting value ST5 is set to a position where the number of the digit exceeds the number of digits printable by one line. In this case, the printing apparatus processor 20 assumes that the position exceeded is set to the next line, and sets two lines as a line for setting the delimiter area. That is, the printing apparatus processor 20 sets an area from 1 digit to 20 digits of the first line to the first delimiter area, sets an area from the twenty-first digit to the thirtieth digit of the one line and from the first digit to the twentieth digit of the second line to the middle delimiter area, and sets an area from the twenty-first digit to the thirtieth digit of the second line to the last delimiter area. In a case where two lines are converted as one line, the twenty-first digit of the second line corresponds to the fiftieth digit of the one line.

Figure 14:
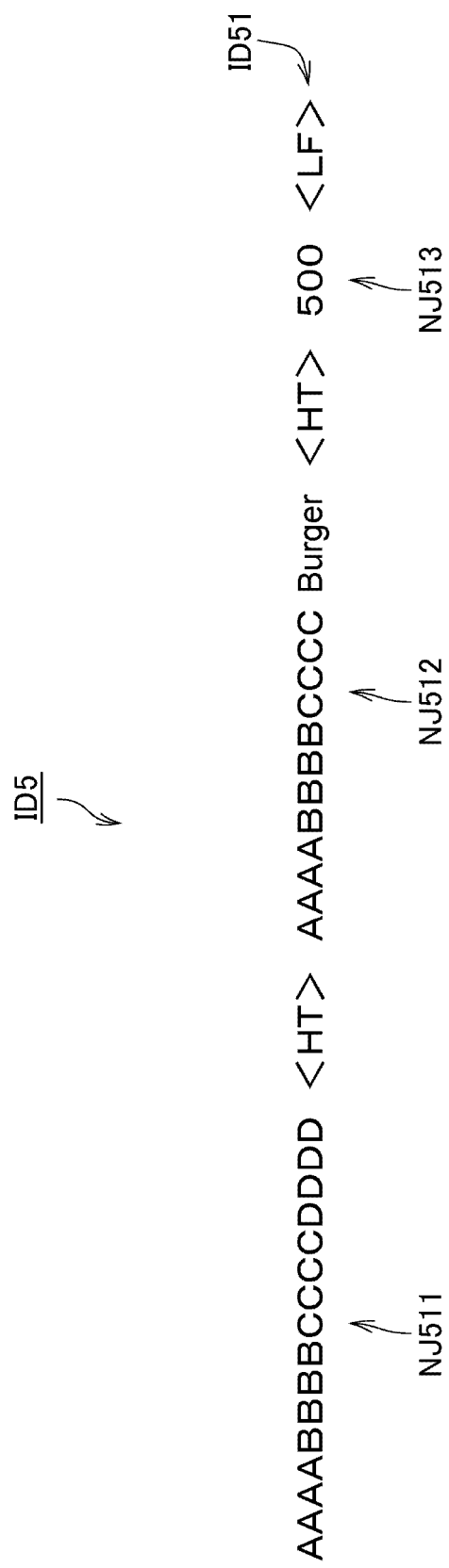
FIG. 14 is a diagram illustrating an example of the print data.
Figure 15:
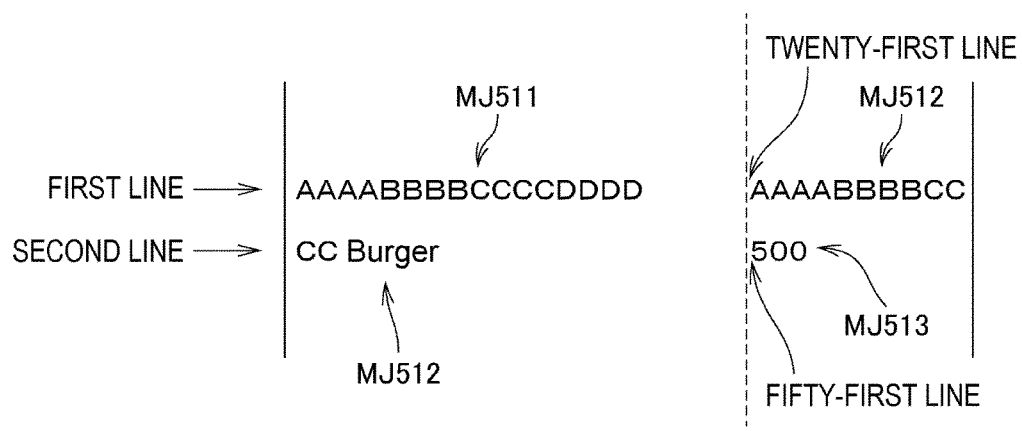
FIG. 15 is a diagram illustrating an example of the printing result.

When executing the processing based on such a tab position setting command TC3 and the print data ID4 illustrated in FIG. 14, the printing apparatus processor 20 outputs the printing result illustrated in FIG. 15.

FIG. 14 is a diagram illustrating an example of the print data.

Print data ID5 illustrated in FIG. 14 includes line print data ID51.

The line print data ID51 includes the tab command and the line feed command. In FIG. 15, the tab command is denoted as "<HT>". In addition, the line feed command is denoted as "<LF>".

The line print data ID51 includes a character string MJ511 indicating "AAAABBBBCCCCDDDD", a character string MJ512 indicating "AAAABBBBCCCC Burger", and a character string MJ513 indicating "500". The character string MJ511, the character string MJ512, the character string MJ513 are delimited by the tab command. Accordingly, each of the character string MJ511, the character string MJ512, and the character string MJ513 corresponds to the delimiter string in which the character string indicated by the line print data ID51 is delimited by the tab command. The character string indicated by the line print data ID51 is a character string including the character string MJ511, the character string MJ512, and the character string MJ513.

FIG. 15 is a diagram illustrating an example of the printing result.

As described above, in a case where the tab position is set at a position where the number of digits exceeds the number of the printable digits of one line, the printing apparatus processor 20 sets two lines to a line for setting the delimiter area. That is, the printing apparatus processor 20 sets an area from 1 digit to 20 digits of the first line to the first delimiter area, sets an area from the twenty-first digit to the thirtieth digit of the one line and from the first digit to the twentieth digit of the second line to the middle delimiter area, and sets an area from the twenty-first digit to the thirtieth digit of the second line to the last delimiter area.

Therefore, as illustrated in FIG. 15, the printing apparatus processor 20 prints the character string MJ511 of the print data ID5 on the area from the first digit to the twenty-first digit of first line. In addition, the printing apparatus processor 20 separately prints the character string MJ512 of the print data ID5 into the area from the twenty-first digit to the thirtieth digit of the first line and the area from the first digit to the twentieth digit of the second line. The printing apparatus processor 20 prints the character string MJ513 of the print data ID5 on the area from the first digit to the thirtieth digit of second line. In a case where the number of digits of one line is set to 30 digits, if the received character string has over 30 digits, the printing apparatus processor 20 automatically executes the line feed command <LF>.

As described above, in a case where the tab position is set at the position where the number of digits exceeds the number of printable digits of one line by the tab position setting command, the printing apparatus processor 20 executes processing such that the printing result becomes a plurality of lines. There is a case where some user desires printing various types of the character string with respect to one content such as the character string indicating the amount of money, the character string indicating the product name, the character string indicating the serial number of the product on the receipt without trimming. In such a case, by setting the tab position at a position where the number of lines exceeds the number of digits printable by one line, the printing apparatus processor 20 prints the printing result in a plurality of lines. Therefore, printing can be performed in the format desired of the user.

As described above, the printer 2 (printing apparatus) includes the transmitter and receiver 25 (communicator) that receives the setting command capable of setting the style of the character string for each delimiter area indicating an area of a line delimited by a tab position, a tab command for executing movement of the printing position to the tab position, and a delimiter string that is delimited by the tab command for each delimiter area indicating an area of a line delimited by the tab position, the printing apparatus memory device 21 (memory device) that stores style data (information indicating the style), the printing apparatus processor 20 (processor) that executes processing on the delimiter string based on the style of the corresponding delimiter area, and the printing mechanism 22 (printing mechanism) that prints the delimiter string which is processed by the printing apparatus processor 20.

Accordingly, since the printing apparatus processor 20 executes processing on the delimiter string corresponding to the delimiter area for each of the delimiter areas based on the set style and prints the character string in which processing is executed, it can be simply printed in a format desired by the user without taking time and labor of the user. Accordingly, even in a case where the printer driver is not installed in the tablet terminal device 3 or the print data is transmitted without involving the printer driver, the printer 2 can perform printing in a format desired by the user. That is, even in an environment without using the printer driver, the printer 2 can perform printing in a format desired by the user if receiving the print data including the delimiter string delimited by the tab command. Therefore, the user need only set the setting command corresponding to the tab position setting command appropriately once, and it is not necessary to perform the operation of inserting or changing the command each time printing is performed on the application side. In addition, in the present embodiment, the print data is data in which character strings are delimited by the tab command, and is simple data. Accordingly, the user can easily generate the print data.

In addition, the printing apparatus processor 20 executes processing based on the style such that the delimiter area from the left end (beginning) of the line to the first tab position is set as the first delimiter area, and sets the delimiter area from the last tab position to the right end (termination) of the character string is set as the last delimiter area, based on the set tab position.

As described above, in a case where the first delimiter area is not set, the printing apparatus processor 20 cannot easily determine which delimiter area is the first delimiter area, and for example, there is a possibility in that the printing apparatus processor 20 starts printing by spacing one delimiter area, and printing is executed in a format different from the format desired by the user such as the character string included in the line print data does not fit in one line. In addition, in a case where the last delimiter area is not set, the printing apparatus processor 20 cannot easily determine which delimiter area is the last delimiter area, and for example, there is a possibility in that printing is executed in the format different from the format desired by the user such as the case that the line print data to be printed originally in one line is divided into a plurality of lines. In this regard, as described above, in a configuration in which the delimiter string is processed in the style data for each of the delimiter areas, by setting the first delimiter area and the last delimiter area, the line print data to be printed in one line can be appropriately printed in one line and can be printed in the format desired by the user.

In addition, in a case where the tab position is not set, the printing apparatus processor 20 executes processing based on the style with the area from the left end to the right end of the line as a delimiter area.

As described above, there is a character string which may be printed without specifying the right side, the left side, the center side, or the like of the printing surface of the roll paper depending on the character string. In a case where the tab position is not set by the tab position setting command, the printing apparatus processor 20 executes the processing based on the style data as a delimiter area from the left end to the right end of the line. Accordingly, if the tab position is not set by the tab position setting command, the character string which can be printed without specifying the right side, the left side, the center side, or the like of the printing surface of the roll paper can be printed on the line. Therefore, the user can print such the character string processed based on the style data on the roll paper without specifying the printing position, without setting the tab position. That is, the printing apparatus processor 20 can perform printing in a format desired by the user without taking the time and labor of the user.

The style data is information for setting at least one of the alignment, the margin, the character decoration, and the character size.

As described above, since the style data is at least information for setting any one of the alignment, the margin, the character decoration, and the character size, the printing apparatus processor 20 can set any one of the alignment, the margin, the character decoration, and the character size on the delimiter string corresponding to the delimiter area for each of the delimiter areas, and it is possible to print in the format desired by the user.

In addition, the style data is information for setting at least one of trimming of the character string and the numerical format.

As described above, since the style data is at least information for setting any one of character string trimming and numerical format, the printing apparatus processor 20 sets, for each delimiter area, a delimiter string corresponding to the delimiter area, at least one of trimming of character string and numerical format can be set, and it is possible to print in the format desired by the user.

In addition, in a case where the tab position is set at a position where the number of the lines exceeds the number of digits printable by one line (the number of printable digits), the printing apparatus processor 20 controls the printing mechanism 22 such that the printing result by the printing mechanism 22 becomes a plurality of lines and executes processing.

As described above, there is a case where some user desires printing various types of the character string with respect to one content such as the character string indicating the amount of money, the character string indicating the product name, the character string indicating the serial number of the product on the receipt without trimming. In such a case, by setting the tab position at a position where the number of lines exceeds the number of digits in printable by one line, the printing apparatus processor 20 prints the printing result in a plurality of lines. Therefore, printing can be executed without trimming various character strings with respect to the contents of 1 and printing can be performed in the format desired of the user.

In addition, the printing mechanism has a cutter for cutting the roll paper (printing medium), and issues the roll paper cut by the cutter as a receipt.

Accordingly, since the printing mechanism 22 issues the roll paper as a receipt, the printing apparatus processor 20 can issue a receipt in a format desired by the user without taking the time and labor of the user.

The above-described embodiment is an aspect of the present invention, and thus any modification and application may be made within the subject matter of the present invention.

For example, the printer 2 may have a configuration in which each of the tab position setting commands TC1 to TC3 is stored in the printing apparatus memory device 21, or a configuration in which each of the tab position setting commands TC1 to TC3 is acquired from the tablet terminal device 3.

In addition, for example, in a case where the control method of the printer 2 (the control method of the printing apparatus) described above is realized using the computer included in the printer 2, the present invention can also be configured in the form of a program executed by a computer to realize the above control method, a recording medium in which the program is recorded so as to be readable by the computer, or a transmission medium for transmitting the program. As the recording medium, a magnetic or optical recording medium or a semiconductor memory device can be used. Specifically, examples of the recording medium include a portable type or fixed type recording medium such as a flexible disk, an hard disk drive (HDD), a compact disk read only memory (CD-ROM), a digital versatile disk (DVD), a Blu-ray (registered trademark) disc, a magneto-optical disk, a flash memory, or a card type recording medium. Further, the recording medium may be a nonvolatile storage device such as a random access memory (RAM), a read only memory (ROM), a HDD, or the like which is an internal storage device included in the printer 2.

Further, for example, the processing unit in FIG. 2 is divided according to the main processing content in order to make the processing of the printer 2 easy to understand, and the present invention is not limited by the way and name of division of processing units. The processing of the printer 2 may be divided into many processing units as needed according to the processing content. In addition, it may be divided so that one processing unit includes more processing.

In addition, each functional unit illustrated in FIG. 1 indicates a functional configuration, and a specific implementation form is not particularly limited. That is, it is not necessary to be mounted a hardware individually corresponding to each functional unit, and it is also possible to adopt a configuration in which one processor realizes the functions of a plurality of functional units by executing programs. In addition, a part of the function realized by software in the embodiment may be realized by a hardware, or a part of the function realized by a hardware may be realized by software. Furthermore, a specific detail construction of another unit of the printer 2 and the tablet terminal device 3 can be also arbitrarily changed without departing from the scope of the invention.

What is claimed is:

1. A printing apparatus comprising:
   a communicator configured to receive, from a terminal device:
   a setting command that includes a style for each delimiter area of a character string in a line of print data, wherein the style of each delimiter area is set based on the setting command, wherein each delimiter area indicates an area of the line delimited by a tab position, wherein the tab position corresponds to a position in the line of print data,
   a tab command for executing movement of a printing position to the tab position, and
   wherein the character string includes a delimiter string for each delimiter area, wherein the delimiter strings are delimited by the tab command;
   a memory configured to store information indicating the style of each delimiter area of the character string;
   a processor configured to execute processing on each of the delimiter strings to change each of the delimiter strings based on the style of the corresponding delimiter area; and
   a printing mechanism configured to print the delimiter strings that have been changed by the processor based on the style.

2. The printing apparatus according to claim 1, wherein based on the set tab position, the processor executes processing on the assumption that the delimiter area from a beginning of the line to a first tab position is the first delimiter area, and the delimiter area from the last tab position to a termination of the line is the last delimiter area based on the style.

3. The printing apparatus according to claim 1, wherein in a case where the tab position is not set, the processor executes processing on the assumption that the area from the beginning to the termination of the line is the delimiter area based on the style.

4. The printing apparatus according to claim 1, wherein the information indicating the style is at least information for setting any one of alignment, margin, character decoration, and a character size.

5. The printing apparatus according to claim 1, wherein the information indicating the style is at least information for setting any one of character string trimming and numerical formatting.

6. The printing apparatus according to claim 1, wherein in a case where the tab position is set at a position where the number of digits exceeds the number of printable digits of one line, the processor executes processing such that a printing result by the printing mechanism becomes a plurality of lines.

7. The printing apparatus according to claim 1, wherein the printing mechanism includes a cutter configured to cut a printing medium and issues the printing medium cut by the cutter as a receipt.

8. A method for controlling a printing apparatus including a processor and a memory configured to store information indicating a style of a character string, the method comprising:
   receiving a setting command from a terminal device, wherein the setting command includes a style for each delimiter area of a character string in a line of print data, wherein the style of each delimiter area is set based on the setting command, wherein each delimiter area indicates an area of the line of print data delimited by a tab position, wherein the tab position corresponds to a position in the line of print data;
   receiving a tab command for executing movement of a printing position to the tab position, wherein the character string includes a delimiter string for each delimiter area, where the delimiter strings are delimited by the tab command;
   storing information indicating the style of each delimiter area of the character string in the memory;
   executing processing on each of the delimiter strings to change each of the delimiter strings based on the style of the corresponding delimiter area; and
   printing the processed delimiter strings that have been changed by the processor based on the style.

9. The method for controlling a printing apparatus according to claim 8,
wherein in the executing of the processing based on the style, based on the set tab position, it is assumed that the delimiter area from a beginning of the line to a first tab position is as the first delimiter area, and the delimiter area from the last tab position to a termination of the line is as the last delimiter area based on the style.

10. The method for controlling a printing apparatus according to claim 8,
wherein in the executing of the processing based on the style, in a case where the tab position is not set, on the assumption that the area from the beginning to the termination of the line is the delimiter area, processing is executed based on the style.

11. The method for controlling a printing apparatus according to claim 8,
wherein the information indicating the style is at least information for setting any one of alignment, margin, character decoration, and a character size.

12. The method for controlling a printing apparatus according to claim 8,
wherein the information indicating the style is at least information for setting any one of character string trimming and numerical formatting.

13. The method for controlling a printing apparatus according to claim 8,
wherein in the executing of the processing based on the style, in a case where the tab position is set at a position where the number of digits exceeds the number of printable digits of one line, processing is executed on the one-line character string such that a printing result by the printing mechanism becomes a plurality of lines.

14. The method for controlling a printing apparatus according to claim 8,
wherein in the printing of the character string, the printing medium is cut by a cutter included in the printing apparatus.

* * * * *